(12) United States Patent
Ricci et al.

(10) Patent No.: US 11,746,167 B2
(45) Date of Patent: Sep. 5, 2023

(54) PROCESS FOR THE PREPARATION OF POLYISOPRENE WITH A MAINLY ALTERNATING CIS-1,4- ALT-3,4 STRUCTURE IN THE PRESENCE OF A CATALYTIC SYSTEM COMPRISING A PYRIDYL IRON COMPLEX

(71) Applicant: VERSALIS S.P.A., San Donato Milanese (IT)

(72) Inventors: Giovanni Ricci, Parma (IT); Anna Sommazzi, Novara (IT); Guido Pampaloni, Pontedera (IT); Giuseppe Leone, Milan (IT); Francesco Masi, Sant'angleo Lodigiano (IT)

(73) Assignee: Versalis S.P.A., Milanese (IT)

( * ) Notice: Subject to any disclaimer, the term of this patent is extended or adjusted under 35 U.S.C. 154(b) by 341 days.

(21) Appl. No.: 16/962,056

(22) PCT Filed: Jan. 16, 2019

(86) PCT No.: PCT/IB2019/050333
§ 371 (c)(1),
(2) Date: Jul. 14, 2020

(87) PCT Pub. No.: WO2019/142108
PCT Pub. Date: Jul. 25, 2019

(65) Prior Publication Data
US 2020/0369805 A1   Nov. 26, 2020

(30) Foreign Application Priority Data

Jan. 17, 2018  (IT) .......................... 102018000001149

(51) Int. Cl.
*C08F 136/08* (2006.01)
*A43B 1/10* (2006.01)
(Continued)

(52) U.S. Cl.
CPC .............. *C08F 136/08* (2013.01); *A43B 1/10* (2013.01); *B60C 1/0016* (2013.01); *C07F 15/025* (2013.01)

(58) Field of Classification Search
CPC ................................................... C08F 136/08
See application file for complete search history.

(56) References Cited

U.S. PATENT DOCUMENTS 5,082,906 A  1/1992  Hsu et al.
5,239,023 A  8/1993  Hsu et al.
(Continued)

FOREIGN PATENT DOCUMENTS

CN  1084854148 A  8/2015
CN  106632764 A  5/2017
(Continued)

OTHER PUBLICATIONS

USPTO Translation of Ikeda (JP 4513569B2). (Year: 2010).*
(Continued)

*Primary Examiner* — Catherine S Branch
(74) *Attorney, Agent, or Firm* — Ruggiero McAllister & McMahon LLC

(57) ABSTRACT

Process for the preparation of polyisoprene with a mainly alternating cis-1,4-alt-3,4 structure comprising polymerizing isoprene in the presence of a catalytic system comprising:

(Continued)

(a) at least one pyridyl iron complex having general formula (I):

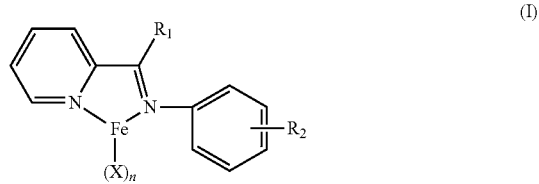

wherein:

$R_1$ is selected from linear or branched $C_1$-$C_{20}$, preferably $C_1$-$C_{15}$, alkyl groups, optionally substituted cycloalkyl groups, optionally substituted aryl groups;

$R_2$ is selected from linear or branched $C_1$-$C_{10}$, preferably $C_1$-$C_3$, alkyl groups; X, mutually identical or different, represent a halogen atom such as, for example, chlorine, bromine, iodine; or they are selected from linear or branched $C_1$-$C_{20}$, preferably $C_1$-$C_{15}$, alkyl groups, —$OCOR_3$ groups or —$OR_3$ groups wherein $R_3$ is selected from linear or branched $C_1$-$C_{20}$, preferably $C_1$-$C_{15}$, alkyl groups.

n is 2 or 3;

(b) at least one co-catalyst selected from organo-derivative compounds of aluminum, preferably from ($b_1$) aluminoxanes having general formula (II):

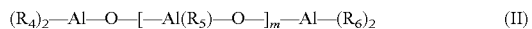

$$(R_4)_2\text{—Al—O—}[\text{—Al}(R_5)\text{—O—}]_m\text{—Al—}(R_6)_2 \quad (II)$$

wherein $R_4$, $R_5$ and $R_6$, mutually identical or different, represent a hydrogen atom, or a halogen atom such as, for example, chlorine, bromine, iodine, fluorine; or they are selected from linear or branched $C_1$-$C_{20}$ alkyl groups, cycloalkyl groups, aryl groups, said groups being optionally substituted with one or more silicon or germanium atoms; and m is an integer ranging from 0 to 1000;

($b_2$) aluminum compounds having general formula (III):

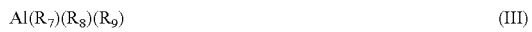

$$Al(R_7)(R_8)(R_9) \quad (III)$$

wherein $R_7$ is a hydrogen atom, or is selected from linear or branched $C_1$-$C_{20}$ alkyl groups, cycloalkyl groups, aryl groups, alkylaryl groups, arylalkyl groups, alkoxy groups; $R_8$ and $R_9$, mutually identical or different, are selected from linear or branched $C_1$-$C_{20}$ alkyl groups, cycloalkyl groups, aryl groups, alkylaryl groups, arylalkyl groups;

wherein the molar ratio between the aluminum present in the co-catalyst and the iron present in the iron pyridyl complex having general formula (I) is ranging from 5 to 60, preferably from 8 to 55.

17 Claims, 20 Drawing Sheets

(51) Int. Cl.
  *B60C 1/00* (2006.01)
  *C07F 15/02* (2006.01)

(56) References Cited

U.S. PATENT DOCUMENTS

| | | |
|---|---|---|
| 2001/0036899 A1 | 11/2001 | Luo |
| 2003/0119662 A1 | 6/2003 | Kerns et al. |
| 2014/0011971 A1 | 1/2014 | Ritter et al. |
| 2015/0329654 A1 | 11/2015 | Masi et al. |

FOREIGN PATENT DOCUMENTS

| | | | | |
|---|---|---|---|---|
| CN | 106795181 A | 5/2017 | | |
| DE | 10 2004 059 156 A1 | 6/2006 | | |
| GB | 1 341 275 A | 12/1973 | | |
| JP | 4513569 B2 * | 7/2010 | | C07D 307/33 |
| WO | 2004/020413 A1 | 3/2004 | | |
| WO | 20040020413 A1 | 3/2004 | | |
| WO | 2016/042014 A1 | 3/2016 | | |
| WO | 2018073795 A1 | 4/2018 | | |

OTHER PUBLICATIONS

Chinese Office Action dated Dec. 6, 2022 from Chinese Patent Application No. 201980008295.8, 18 pages.
Xiaohong et al.; "13c-NMR of 3,4/cis-1,4 polyisoprene synthesized by iron catalyst system"; Abstract Collection of Papers of the 4th National Academic Conference on Spectroscopy; Dec. 31, 1986, pp. 344-345.
Giovanni et al.; "3,4/cis-1,4 Polyisoprene: Synthesis and Characterization", Macromolecules, vol. 42, Issue 23, Dec. 8, 2009, pp. 9263-9267.
Zhang et al.; "Phosphine-Iminiquinoline Iron Complexes for Ethylene Polymerization and Copolymerization" Organometallics, vol. 36, Issue 19, Oct. 9, 2017, pp. 3785-3764.
India Office Action dated Jan. 19, 2022 for India Patent Appl. No. 202017029502.
Ricci et al; "cis-1,4- alt-3,4 Polyisoprene: Synthesis and Characterization"; Macromolecules vol. 42, No. 23; Dec. 8, 2009; pp. 1-6.
International Search Report dated Feb. 25, 2019 for PCT application No. PCT/IB2019/050333.
Written Opinion dated Feb. 25, 2019 for PCT application No. PCT/IB2019/050333.

\* cited by examiner alternating cis-1,4-alt-3,4 sequence cis-1,4 sequences within the alternating structure

PROCESS FOR THE PREPARATION OF POLYISOPRENE WITH A MAINLY ALTERNATING CIS-1,4- ALT-3,4 STRUCTURE IN THE PRESENCE OF A CATALYTIC SYSTEM COMPRISING A PYRIDYL IRON COMPLEX

CROSS REFERENCE TO RELATED APPLICATIONS

This application is a national stage application, filed under 35 U.S.C. § 371, of International Patent Application No. PCT/IB2019/050333, filed on Jan. 16, 2019, which claims priority to Italian Patent Application 102018000001149, filed on Jan. 17, 2018, the entire contents of each of which is incorporated by reference herein in its entirety.

BACKGROUND OF THE DISCLOSURE

1. Field of the Disclosure

The present invention relates to a process for the preparation of polyisoprene with a mainly alternating cis-1,4-alt-3,4 structure.

More in particular, the present invention relates to a process for the preparation of polyisoprene with a mainly alternating cis-1,4-alt-3,4 structure comprising polymerizing isoprene in the presence of a catalytic system comprising: at least one pyridyl iron complex; at least one co-catalyst selected from organo-derivative compounds of aluminum.

2. Description of Related Art

It is known that the stereospecific (co)polymerization of conjugated dienes is a very important process in the chemical industry in order to obtain products that are among the most widely used rubbers.

It is also known that the stereospecific polymerization of isoprene can provide stereoregular polymers with different structures: cis-1,4; trans-1,4; 3,4, isotactic and syndiotactic.

For example, polyisoprene with a cis-1,4 structure can be prepared using catalytic systems comprising neodymium based catalysts and aluminum compounds [for example, the catalytic system diethylaluminum chloride/neodymium 2-ethylhexanoate/tri-iso-butylaluminum (AlEt$_2$Cl/Nd (OCOC$_7$H$_{15}$)$_3$/Al$^i$Bu$_3$)], as described, for example, in: Ricci G. et al, "*Die Makromoleculare Chemie, Rapid Communications*" (1986), Vol. 7, pp. 355-359; Ricci G. et al, "*Polymer Communications*" (1987), Vol. 28, Issue 8, pp. 223-226; Porri L. et al, "*ACS Symposium Series 749—Olefin Polymerization: Emerging Frontiers*" (2000), Arjunan P., McGrath J. C. and Hanlon T. Eds., Oxford University Press, USA, pp. 15-30.

Alternatively, said polyisoprene with a cis-1,4 structure can be prepared using catalytic systems comprising titanium based catalysts and aluminum compounds [for example, the catalytic system titanium tetrachloride/triethyl aluminum (TiCl$_4$/AlEt$_3$)], as described, for example, in: Porri L. et al "*Comprehensive Polymer Science*" (1989), Eastmond, G. C., Ledwith A., Russo S., Sigwalt P. Eds., Pergamon Press Ltd., Oxford Vol. 4, Part II, pp. 53-108; Horne S. E. et al, "*Industrial Engineering Chemistry*" (1956), Vol. 48 (4), pp. 784-791.

A polyisoprene with a trans-1,4 structure analogous to that of gutta-percha is described by Natta G. et al in "*Chemical Abstract*" (1959), Vol. 53, pp. 3756 and in Italian patent application IT 536631.

Alternatively, polyisoprene with a trans-1,4 structure, can be prepared using catalytic systems comprising vanadium based catalysts [for example, the catalytic system vanadium triacetylacetonate/methylaluminoxane (V(acac)$_3$/MAO), operating at a low temperature, i.e. at a temperature<−20° C.], as described, for example, in Ricci G. et al, "*Macromolecular Chemistry and Physics*" (1994), Vol. 195, Issue 4, pp. 1389-1397; Ricci G. et al, "*Journal. Polymer Science Part A: Polymer Chemistry*" (2007), Vol. 45, Issue 20, pp. 4635-4646.

Polyisoprene with a syndiotactic 3,4 structure can be prepared using catalytic systems comprising iron based catalysts [for example, the catalytic system diethyl bis(2,2'-bipyridine)iron/methylaluminoxane (FeEt$_2$(bipy)$_2$/MAO), or diethyl bis(2,2'-bipyridine)iron dichloride/methylaluminoxane (Fe(bipy)$_2$Cl$_2$/MAO)] as described, for example, in: Bazzini C. et al, "*Macromolecular Rapid Communications*" (2002), Vol. 23, pp. 922-927; Ricci G. et al, "*Journal of Molecular Catalysis A: Chemical*" (2003), 204-205, pp. 287-293; Bazzini C. et al, "*Polymer*" (2004), Vol. 45, pp. 2871-2875; Pirozzi B. et al, "*Macromolecular Chemistry and Physics*" (2004), Vol. 205, Issue 10, pp. 1343-1350; Ricci G. et al, "*Coordination Chemistry Reviews*" (2010), Vol. 254, Issue 5-6, pp. 661-676; or in international patent application WO 02/102861.

Polyisoprene with an isotactic 3,4 structure can be prepared using catalytic systems comprising catalysts based on scandium metallocene complexes as described, for example, in: Zhang L. et al, "*Journal of the American Chemical Society*" (2005), Vol. 127(42), pp. 14562-14563; Nakajima Y. et al, "*Organometallics*" (2009), Vol. 28 (24), pp. 6861-6870.

A polyisoprene with a perfectly alternating cis-1,4-alt-3,4 structure has recently been obtained through the polymerization of isoprene in the presence of a catalytic system comprising a catalyst based on cobalt complexes with aromatic phosphines and methylaluminoxane (MAO), i.e. the catalytic system CoCl$_2$(PRPh$_2$)$_2$/MAO (wherein R=ethyl, n-propyl, iso-propyl, cyclohexyl), as described, for example in Ricci G. et al, "*Macromolecules*" (2009), Vol. 42(23), pp. 9263-9267. The aforesaid polyisoprene is said to have a molecular weight ranging from 60000 g×mol$^{-1}$ to 80000 g×mol$^{-1}$ and a glass transition temperature (T$_g$) equal to about −18° C.

It is also known that catalytic systems comprising pyridyl iron complexes are able to provide (co)polymers of conjugated dienes, such as polybutadiene or polyisoprene with a mixed structure and, in particular, to modulate the microstructure of the (co)polymers of conjugated dienes obtained, i.e. the 1,4-cis, 1,4-trans and 1,2 unit content in the polybutadiene and the 1,4-cis, 1,4-trans and 3,4 unit content in the polyisoprene, and also to provide syndiotactic 1,2 polybutadiene as described, for example, in Italian patent applications IT 102016000105714 and IT 102016000105730 in the name of the Applicant.

SUMMARY OF THE DISCLOSURE

As polyisoprene with a mainly alternating cis-1,4-alt-3,4 structure can be advantageously used in different sectors such as, for example, for producing tires, in particular for tire treads, as well as in the footwear industry (for example, for producing soles for shoes), the study of new processes able to provide said polyisoprene is still of great interest.

The Applicant therefore set out to solve the problem of finding a new process able to provide polyisoprene with a mainly alternating cis-1,4-alt-3,4 structure.

The Applicant has now found a process for the preparation of polyisoprene with a mainly alternating cis-1,4-alt-3,4 structure comprising polymerizing isoprene in the presence of a catalytic system comprising: at least one pyridyl iron complex having the specific general formula (I) provided below; at least one co-catalyst selected from organo-derivative compounds of aluminum. The use of said catalytic system allows a polyisoprene with a mainly alternating cis-1,4-alt-3,4 structure to be obtained. Said catalytic system further enables operation at a low molar ratio between the aluminum contained in the co-catalyst and the iron contained in the pyridyl iron complex having specific general formula (I) reported below and, in particular, thanks to its high catalytic activity, low quantities of co-catalyst and iron to be used, with consequent significant advantages from an economic point of view. Furthermore, said catalytic system can be used in the presence of an inert organic solvent selected from aliphatic hydrocarbons, with consequent significant advantages both from an economic point of view and from an environmental sustainability point of view.

The subject matter of the present invention is therefore a process for the preparation of polyisoprene with a mainly alternating cis-1,4-alt-3,4 structure comprising polymerizing isoprene in the presence of a catalytic system comprising:

(a) at least one pyridyl iron complex having general formula (I):

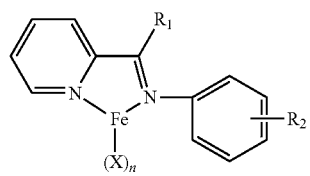

wherein:
R$_1$ is selected from linear or branched C$_1$-C$_{20}$, preferably C$_1$-C$_{15}$, alkyl groups, optionally substituted cycloalkyl groups, optionally substituted aryl groups;
R$_2$ is selected from linear or branched C$_1$-C$_{10}$, preferably C$_1$-C$_3$, alkyl groups;
X, mutually identical or different, represent a halogen atom such as, for example, chlorine, bromine, iodine; or they are selected from linear or branched C$_1$-C$_{20}$, preferably C$_1$-C$_{15}$, alkyl groups, —OCOR$_3$ groups or —OR$_3$ groups wherein R$_3$ is selected from linear or branched C$_1$-C$_{20}$, preferably C$_1$-C$_{15}$, alkyl groups.
n is 2 or 3;

(b) at least one co-catalyst selected from organo-derivative compounds of aluminum, preferably from
(b$_1$) aluminoxanes having general formula (II):

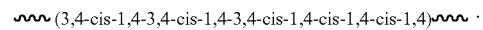

wherein R$_4$, R$_5$ and R$_6$, mutually identical or different, represent a hydrogen atom, or a halogen atom such as, for example, chlorine, bromine, iodine, fluorine; or they are selected from linear or branched C$_1$-C$_{20}$ alkyl groups, cycloalkyl groups, aryl groups, said groups being optionally substituted with one or more silicon or germanium atoms; and m is an integer ranging from 0 to 1000;

(b$_2$) aluminum compounds having general formula (III):

$$Al(R_7)(R_8)(R_9) \qquad (III)$$

wherein R$_7$ is a hydrogen atom, or is selected from linear or branched C$_1$-C$_{20}$ alkyl groups, cycloalkyl groups, aryl groups, alkylaryl groups, arylalkyl groups, alkoxy groups; R$_8$ and R$_9$, mutually identical or different, are selected from linear or branched C$_1$-C$_{20}$ alkyl groups, cycloalkyl groups, aryl groups, alkylaryl groups, arylalkyl groups;

wherein the molar ratio between the aluminum present in the co-catalyst and the iron present in the iron pyridyl complex having general formula (I) is ranging from 5 to 60, preferably from 8 to 55.

For the purpose of the present description and of the following claims, the definitions of the numeric ranges always include the extremes unless specified otherwise.

For the purpose of the present description and of the following claims, the term "comprising" also includes the terms "which essentially consists of" or "which consists of".

For the purpose of the present description and of the following claims, the term "polyisoprene with a mainly alternating structure" indicates that in said polyisoprene there are short sequences of cis-1,4 units (i.e. 3 units) spaced out with alternating cis-1,4/3,4 sequences; said polyisoprene can be represented as follows:

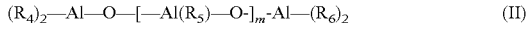

For the purpose of the present description and of the following claims, the term "C$_1$-C$_{10}$ alkyl groups" and "C$_1$-C$_{20}$ alkyl groups" means alkyl groups having from 1 to 10 carbon atoms and from 1 to 20 carbon atoms, respectively, linear or branched. Specific examples of C$_1$-C$_{10}$ and C$_1$-C$_{20}$ alkyl groups are: methyl, ethyl, n-propyl, iso-propyl, n-butyl, s-butyl, iso-butyl, tert-butyl, pentyl, hexyl, heptyl, octyl, n-nonyl, n-decyl, 2-butyloctyl, 5-methylhexyl, 4-ethylhexyl, 2-ethylheptyl, 2-ethylhexyl.

For the purpose of the present description and of the following claims, the term "cycloalkyl groups" means cycloalkyl groups having from 3 to 30 carbon atoms. Said cycloalkyl groups can also be optionally substituted with one or more groups, mutually identical or different, selected from: halogen atoms; hydroxyl groups, C$_1$-C$_{12}$ alkyl groups; C$_1$-C$_{12}$ alkoxy groups; cyano groups; amino groups; nitro groups. Specific examples of cycloalkyl groups are: cyclopropyl, 2,2-difluorocyclopropyl, cyclobutyl, cyclopentyl, cyclohexyl, hexamethylcyclohexyl, pentamethylcyclopentyl, 2-cyclooctylethyl, methylcyclohexyl, methoxycyclohexyl, fluorocyclohexyl, phenylcyclohexyl.

For the purpose of the present description and of the following claims, the term "aryl groups" having 6 to 30 carbon atoms means carbocyclic aromatic groups. Said aryl groups can also be optionally substituted with one or more groups, mutually identical or different, selected from: halogen atoms such as, for example, fluorine, chlorine, bromine; hydroxyl groups, C$_1$-C$_{12}$ alkyl groups; C$_1$-C$_{12}$ alkoxy groups; cyano groups; amino groups; nitro groups. Specific examples of aryl groups are: phenyl, 2-methylphenyl, 4-methylphenyl, 2-tert-butylphenyl, 2,4,6-trimethylphenyl, 2-iso-propylphenyl, methoxyphenyl, hydroxyphenyl, phenyloxyphenyl, fluorophenyl, pentafluorophenyl, chlorophenyl, bromophenyl, nitrophenyl, dimethylaminophenyl, naphthyl, phenylnaphthyl, phenanthrene, anthracene.

For the purpose of the present description and of the following claims, the term "alkylaryl groups" means aryl groups substituted with one or more groups, mutually identical or different, selected from $C_1$-$C_{12}$ alkyl groups. Specific examples of alkylaryl groups are: 2-methylphenyl, 4-methylphenyl, 2,4,6-trimethylphenyl, 2,6-di-iso-propylphenyl.

For the purpose of the present description and of the following claims, the term "arylalkyl groups" means alkyl groups substituted with an aryl group. Specific examples of arylalkyl groups are: benzyl, phenylethyl, 6-naphthylhexyl.

For the purpose of the present description and of the following claims, the term "alkoxy groups" means groups comprising an oxygen atom to which a linear or branched $C_1$-$C_{20}$ alkyl group is bonded. Specific examples of $C_1$-$C_{20}$ alkoxy groups are: methoxy, ethoxy, n-propoxy, iso-propoxy, n-butoxy, iso-butoxy, t-butoxy, pentoxy, hexyloxy, heptyloxy, octyloxy, nonyloxy, decyloxy, dodecyloxy.

In accordance with a preferred embodiment of the present invention, in said pyridyl iron complex having general formula (I):
- $R_1$ represents a methyl group, an ethyl group, an n-propyl group, an iso-propyl group, preferably a methyl group;
- $R_2$ represents a methyl group, an ethyl group, an n-propyl group, an iso-propyl group, preferably a methyl group or an iso-propyl group;
- X, mutually identical, represent a halogen atom such as, for example, chlorine, bromine, iodine; preferably a chlorine atom;
- n is 2 or 3;

The pyridyl iron complex having general formula (I) can be considered, in accordance with the present invention, under any physical form such as, for example, the isolated and purified solid form, the form solvated with an appropriate solvent, or the one supported on suitable organic or inorganic solids, preferably having a granular or powdered physical form.

The pyridyl iron complex having general formula (I) is prepared starting from ligands known in the prior art.

Specific examples of ligands useful for the purpose of the present invention are those having the following formulae (L1) and (L2):

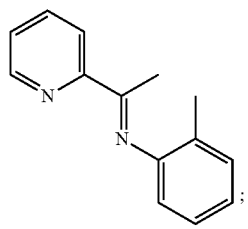

(L1)

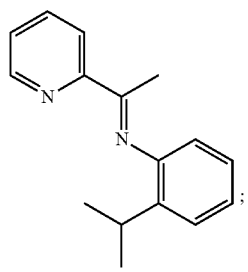

(L2)

Said ligands having formulae (L1) and (L2), can be prepared through processes known in the prior art. For example, said ligands having formulae (L1) and (L2) can be prepared through a process comprising the condensation reaction between an appropriate aniline and 2-acetylpyridine, with the formation of the corresponding imine as described, for example, in: Wu J. et al, "*Journal of American Chemical Society*" (2009), Vol. 131(36), pg. 12915-12917; Laine V. T. et al, "*European Journal of Inorganic Chemistry*" (1999), Vol. 6, pg. 959-964; Bianchini C. et al, "*New Journal of Chemistry*" (2002), Vol. 26(4), pg. 387-397; Lai Yi-C. et al, "*Tetrahedron*" (2005), Vol. 61(40), pg. 9484-9489.

The pyridyl iron complex having general formula (I) may be prepared according to procedures known in the prior art. For example, said pyridyl iron complex having general formula (I) can be prepared by reaction between iron compounds having general formula $Fe(X)_2$ or $Fe(X)_3$ wherein X is a halogen atom such as, for example, chlorine, bromine, iodine, preferably chlorine, as such or complexed with ethers [for example, diethylether, tetrahydrofuran (THF), dimethoxyethane], or with water, with appropriate pyridine ligands (L) such as, for example, the ligands having formulae (L1) or (L2) reported above, in molar ratio ligand (L)/iron (Fe) ranging from 1 to 2 operating, preferably, in presence of at least one solvent which can be selected, for example, from: chlorinated solvents (for example, dichloromethane), ether solvents, [for example, tetrahydrofuran (THF)], alcoholic solvents (for example, butanol), hydrocarbon solvents (for example, toluene, hexane), or mixtures thereof, at a temperature ranging from ambient temperature to +110° C. The pyridyl iron complex having general formula (I) thus obtained can be subsequently recovered by means of methods known in the prior art such as, for example, washing the solid product obtained with an appropriate solvent (for example, heptane), followed by drying (for example, under vacuum). More details on the process for the preparation of said pyridyl iron complex having general formula (I) can be found in the examples reported below.

For the purpose of the present description and of the following claims the expression "ambient temperature" means a temperature ranging from +20° C. to +25° C.

As is known, aluminoxanes are compounds containing Al—O—Al bonds, with a variable O/Al ratio, obtainable according to processes known in the prior art such as, for example, by reaction, in controlled conditions, of an aluminum alkyl, or of an aluminum alkyl halogenide, with water, or with other compounds containing predetermined quantities of available water such as, for example, in the case of the reaction of aluminum trimethyl with aluminum sulfate hexahydrate, copper sulfate pentahydrate, or iron sulfate pentahydrate.

Said aluminoxanes and, in particular, methylaluminoxane (MAO), are compounds that can be obtained through known organometallic chemical processes such as, for example, by adding trimethyl aluminum to a suspension of aluminum sulfate hexahydrate in hexane.

In accordance with a preferred embodiment of the present invention, said aluminoxane having general formula (II) can be selected, for example from: methylaluminoxane (MAO), ethylaluminoxane, n-butylaluminoxane, tetra-iso-butylaluminoxane (TIBAO), tert-butylaluminoxane, tetra-(2,4,4-trimethylpentyl)aluminooxane (TIOAO), tetra-(2,3-dimethylbutyl)aluminoxane (TDMBAO), tetra-(2,3,3-trimethylbutyl)aluminoxane (TTMBAO), or mixtures thereof. Methylaluminoxane (MAO) is particularly preferred. Further details relative to the aluminoxane having general formula (II) can be found, for example, in international patent application WO 2011/061151.

In accordance with a preferred embodiment of the present invention, said aluminum compounds having general formula (III) can be selected, for example, from: diethylaluminum hydride, di-n-propylaluminum hydride, di-n-butyl-aluminum hydride, di-iso-butyl-aluminum hydride (DIBAH), diphenylaluminum hydride, di-p-tolylaluminum hydride, dibenzylaluminum hydride, diethylaluminum hydride, phenyl-n-propylaluminum hydride, p-tolylethylaluminum hydride, p-tolyl-n-propylaluminum hydride, p-tolyl-iso-propylaluminum hydride, benzylethylaluminum hydride, benzyl-n-propylaluminum hydride, benzyl-iso-propylaluminum hydride, diethylaluminum ethoxide, di-iso-butylaluminum ethoxide, dipropylaluminum ethoxide, trimethylaluminum, triethylaluminum (TEA), tri-n-propylaluminum, tri-iso-butylaluminum (TIBA), tri-n-butylaluminum, tripentylaluminum, trihexylaluminum, triciclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum, or mixtures thereof. Tri-iso-butyl-aluminum (TIBA) is preferred.

In general, the formation of the aforesaid catalytic system is preferably carried out in an inert liquid means, more preferably in a hydrocarbon solvent. The choice of the pyridyl iron complex having general formula (I) and of the co-catalyst, as well as the particular methodology used, may vary according to the molecular structures and to the desired result, according to what is similarly reported in relevant literature accessible to an expert skilled in the art for other transition metal complexes with ligands of various nature, such as, for example, in: Ricci G. et al, "*Advances in Organometallic Chemistry Research*" (2007), Yamamoto K. Ed., Nova Science Publisher, Inc., USA, pg. 1-36; Ricci G. et al, "*Coordination Chemistry Reviews*" (2010), Vol. 254, pg. 661-676; Ricci G. et al, "*Ferrocenes: Compounds, Properties and Applications*" (2011), Elisabeth S. Phillips Ed., Nova Science Publisher, Inc., USA, pg. 273-313; Ricci G. et al, "*Chromium: Environmental, Medical and Material Studies*" (2011), Margaret P. Salden Ed., Nova Science Publisher, Inc., USA, pg. 121-1406; Ricci G. et al, "*Cobalt: Characteristics, Compounds, and Applications*" (2011), Lucas J. Vidmar Ed., Nova Science Publisher, Inc., USA, pg. 39-81; Ricci G. et al, "*Phosphorus: Properties, Health effects and Environment*" (2012), Ming Yue Chen and Da-Xia Yang Eds., Nova Science Publisher, Inc., USA, pg. 53-94.

For the purpose of the present invention, the co-catalyst may be placed in contact with a pyridyl iron complex having general formula (I), in proportions such that the molar ratio between the aluminum contained in the co-catalyst and the iron contained in the pyridyl iron complex having general formula (I) is between the values reported above, i.e. the molar ratio between the aluminum contained in the co-catalyst and the iron contained in the pyridyl iron complex having general formula (I) is ranging from 5 to 60, preferably ranging from 8 to 55. The sequence with which the pyridyl iron complex having general formula (I) and the co-catalyst are placed in contact with each other is not particularly critical.

For the purpose of the present description and of the following claims, the terms "mole" and "molar ratio" are used both with reference to compounds consisting of molecules and with reference to atoms and ions, omitting for the latter ones the terms gram atom or atomic ratio, even if they are scientifically more accurate.

For the purpose of the present invention, other additives or components may optionally be added to the aforementioned catalytic system so as to adapt it to satisfy specific practical requirements. The catalytic systems thus obtained can therefore be considered included within the scope of the present invention. Additives and/or components that can be added in the preparation and/or formulation of the aforesaid catalytic system are, for example: inert solvents such as, for example, aliphatic and/or aromatic hydrocarbons; aliphatic and/or aromatic ethers; weakly coordinating additives (e.g., Lewis bases) selected, for example, from non-polymerizable olefins; sterically hindered or electronically poor ethers; halogenating agents such as, for example, silicon halides, halogenated hydrocarbons, preferably chlorinated; or mixtures thereof.

Said catalytic system can be prepared, as already reported above, according to methods known in the prior art.

For example, said catalytic system can be prepared separately (preformed) and subsequently introduced into the polymerization environment. For this purpose, said catalytic system can be prepared by making at least one pyridyl iron complex having general formula (I) react with at least one co-catalyst, optionally in the presence of other additives or components selected from those cited above, in the presence of a solvent such as, for example, toluene, heptane, at a temperature ranging from +20° C. to +60° C., for a time ranging from 10 seconds to 10 hours, preferably ranging from 30 seconds to 5 hours.

Alternatively, said catalytic system can be prepared in situ, i.e. directly in the polymerization environment. For this purpose, said catalytic system can be prepared by separately introducing the pyridyl iron complex having general formula (I), the co-catalyst and the isoprene, operating at the conditions wherein the polymerization is carried out. Further details on the preparation of said catalytic system can be found in the examples reported below.

For the purpose of the present invention, the aforesaid catalytic system can also be supported on inert solids, preferably consisting of silicon and/or aluminum oxides, such as, for example, silica, alumina or silico-aluminates. For supporting said catalytic system the known supporting techniques can be used, generally comprising contact, in a suitable inert liquid medium, between the support, optionally activated by heating to temperatures above +200° C., and one or both components of said catalytic system. It is not necessary, for the purposes of the present invention, for both components to be supported, as the pyridyl iron complex having general formula (I), or the co-catalyst, may also be present on the support surface alone. In the latter case, the missing component on the surface is subsequently placed in contact with the supported component when the active catalytic system is to be formed by polymerization.

The scope of the present invention also includes the pyridyl iron complex having general formula (I), and the catalytic systems based thereon, which are supported on a solid through the functionalization of the latter and the formation of a covalent bond between the solid and the pyridyl iron complex having general formula (I).

The quantity of the pyridyl iron complex having general formula (I) and of the co-catalyst which can be used in the process object of the present invention varies according to the polymerization process to be carried out. As mentioned above, said quantity is however such as to obtain a molar ratio between the aluminum contained in the co-catalyst and the iron contained in the iron pyridyl complex having general formula (I) ranging from 5 to 60, preferably ranging from 8 to 55.

In accordance with a preferred embodiment of the present invention, said process can be carried out in the presence of at least one inert organic solvent selected, for example, from: saturated aliphatic hydrocarbons such as, for example, butane, pentane, hexane, heptane, or mixtures thereof; saturated cycloaliphatic hydrocarbons such as, for example, cyclopentane, cyclohexane, or mixtures thereof; mono-olefins such as, for example, 1-butene, 2-butene, or mixtures thereof; aromatic hydrocarbons such as, for example, benzene, toluene, xylene, or mixtures thereof; halogenated hydrocarbons such as, for example, dichloromethane, chloroform, carbon tetrachloride, trichloroethylene, perchloroethylene, 1,2-dichloroethane, chlorobenzene, bromobenzene, chlorotoluene, or mixtures thereof. Hexane, heptane, toluene, are preferred.

In accordance with a preferred embodiment of the present invention, in said process the concentration of the isoprene in said inert organic solvent may be ranging from 5% by weight to 50% by weight, preferably ranging from 10% by weight to 20% by weight, with respect to the total weight of the mixture of isoprene and inert organic solvent.

In accordance with a preferred embodiment of the present invention, said process can be carried out at a temperature ranging from −30° C. to +60° C., preferably ranging from −20° C. and +30° C.

With regard to pressure, it is preferable to operate at the pressure of the components of the mixture to be polymerized.

Said process can be carried out both continuously and in batch, preferably continuously.

The process according to the present invention allows a polyisoprene with a mainly alternating cis-1,4-alt-3,4 structure to be obtained, having the following characteristics:

glass transition temperature ($T_g$) less than −25° C., preferably ranging from −28° C. to −35° C.

weight average molecular weight ($M_w$) ranging from 100000 g×mol$^{-1}$ to 400000 g×mol$^{-1}$, preferably ranging from 110000 g×mol$^{-1}$ to 380000 g×mol$^{-1}$.

The polyisoprene with a mainly alternating cis-1,4-alt-3,4 structure obtained according to the process of the present invention can be advantageously used in different sectors such as, for example, for the production of tires, in particular for tire treads, as well as in the footwear industry (for example, in the production of shoe soles).

Therefore, further subject matter of the present invention is the use of the polyisoprene with a mainly alternating cis-1,4-alt-3,4 structure obtained according to the process described above for the production of tires, in particular for tire treads, as well as in the footwear industry, in particular in the production of shoe soles.

DETAILED DESCRIPTION OF THE DISCLOSURE

Figure 1A:
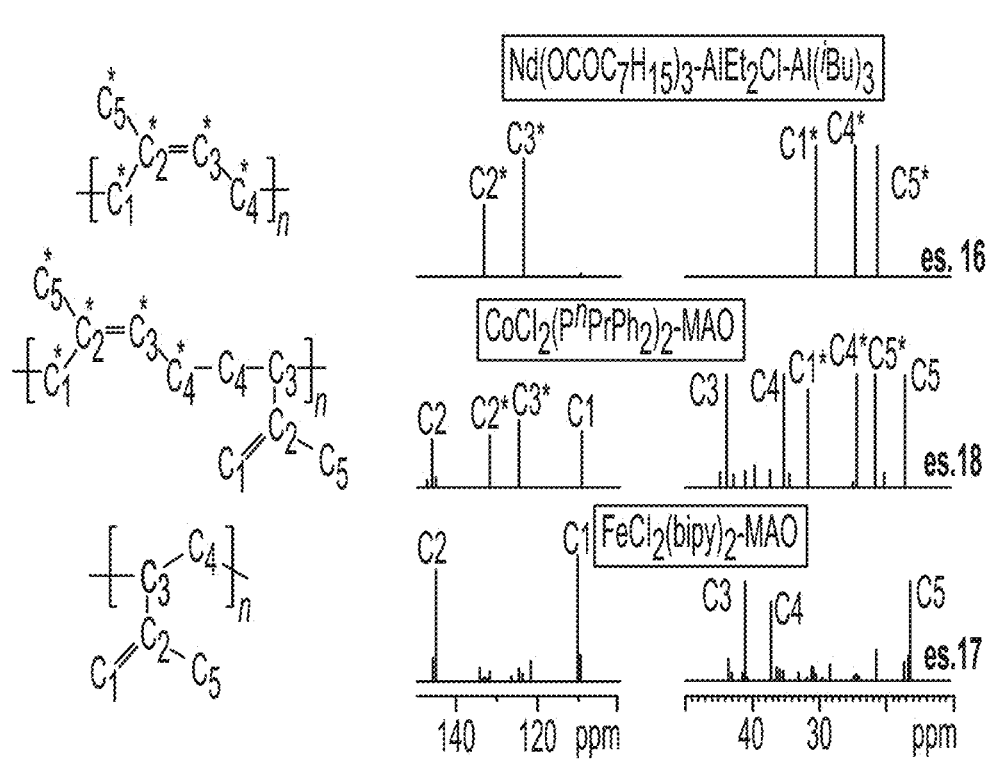
FIG. 1A shows a $^{13}$C-NMR spectrum of a polyisoprene obtained according to the disclosure.

For the purpose of understanding the present invention better and to put it into practice, below are some illustrative and non-limiting examples thereof.

EXAMPLES

Reagents and Materials

The list below reports the reagents and the materials used in the following examples of the invention, any optional pre-treatments thereof and their manufacturer:

iron (III) chloride ($FeCl_3$) (Aldrich): purity 99.9%, used as such;

iron (II) chloride ($FeCl_2$) (Aldrich): purity 97%, used as such;

neodymium 2-ethylhexanoate [$Nd(OCOC_7H_{15})_3$] (Strem Chemicals): used as such;

methylaluminoxane (MAO) (toluene solution 10% by weight) (Crompton): used as such;

tri-iso-butylaluminum (TIBA) (Akzo Nobel): used as such;

diethylaluminum chloride ($AlEt_2Cl$) (Akzo Nobel): used as such;

hydrochloric acid in 37% aqueous solution (Aldrich): used as such;

o-toluidine (Aldrich): distilled at reduced pressure and stored in an inert atmosphere;

2-iso-propylaniline (Aldrich): used as such;

2-acetylpyridine (Aldrich): used as such;

ethyl acetate (Aldrich): used as such;

heptane (Aldrich): pure, ≥99%, distilled over sodium (Na) in an inert atmosphere;

methanol (Carlo Erba, RPE): used as such;
toluene (Aldrich): pure, ≥99.5%, distilled over sodium (Na) in an inert atmosphere;
isoprene (Aldrich): pure, ≥99%, refluxed over calcium hydride for 2 hours, then distilled "trap-to-trap" and stored in a nitrogen atmosphere at +4° C.;
formic acid (HCOOH) (Aldrich): purity 95%, used as such;
p-toluenesulfonic acid monohydrate (Aldrich): pure, 98.5%, used as such;
hydrofluoric acid (HF) (40% aqueous solution) (Aldrich): used as such;
sulfuric acid ($H_2SO_4$) (96% aqueous solution) (Aldrich): used as such, or diluted with distilled water (1/5);
nitric acid ($HNO_3$) (70% aqueous solution) (Aldrich): used as such;
sodium carbonate ($Na_2CO_3$) (Aldrich): used as such;
silver nitrate ($AgNO_3$) (Aldrich): used as such;
deuterated tetrachloroethylene ($C_2D_2Cl_4$) (Acros): used as such;
hexamethyldisilazane (HMDS) (Acros): used as such.

The analysis and characterization methodologies reported below were used.

Elementary Analysis a) Determination of Fe

For the determination of the quantity by weight of iron (Fe) in the pyridyl iron complexes used for the purpose of the present invention, an exactly weighed aliquot, operating in dry-box under nitrogen flow, of about 30 mg-50 mg of sample, was placed in a 30 ml platinum crucible, together with a 1 ml mixture of 40% hydrofluoric acid (HF), 0.25 ml of 96% sulphuric acid ($H_2SO_4$) and 1 ml of 70% nitric acid ($HNO_3$). The crucible was then heated on a hot plate increasing the temperature until white sulfur fumes appeared (about +200° C.). The mixture thus obtained was cooled to ambient temperature and 1 ml of 70% nitric acid ($HNO_3$) was added, then it was left again until fumes appeared. After repeating the sequence another two times, a clear, almost colorless, solution was obtained. 1 ml of nitric acid ($HNO_3$) and about 15 ml of water were then added cold, then heated to +80° C. for about 30 minutes. The sample thus prepared was diluted with MilliQ pure water until it weighed about 50 g, precisely weighed, to obtain a solution on which the instrumental analytical determination was carried out through a Thermo Optek IRIS Advantage Duo ICP-OES (plasma optical emission) spectrometer, for comparison with solutions of known concentration. For this purpose, for every analyte, a calibration curve was prepared in the range 0 ppm-10 ppm, measuring calibration solutions by dilution by weight of certified solutions.

The solution of sample prepared as above was then diluted again by weight in order to obtain concentrations close to the reference ones, before carrying out spectrophotometric measurement. All the samples were prepared in double quantities. The results were considered acceptable if the individual repeated test data did not have a relative deviation of more than 2% with respect to their mean value.

b) Determination of Chlorine

For said purpose, samples of the pyridyl iron complexes used for the purpose of the present invention, about 30 mg-50 mg, were precisely weighed in a 100 ml glass beakers in dry-box under nitrogen flow. 2 g of sodium carbonate ($Na_2CO_3$) were added and, outside the dry-box, 50 ml of MilliQ water. It was brought to the boiling on the hot plate, under magnetic stirring, for about 30 minutes. It was left to cool, then 1/5 diluted sulfuric acid ($H_2SO_4$) was added, until acid reaction and was then titrated with 0.1 N silver nitrate ($AgNO_3$) with a potentiometric titrator.

c) Determination of Carbon, Hydrogen and Nitrogen

The determination of carbon, hydrogen and nitrogen, in the pyridyl iron complexes used for the purpose of the present invention, as well as in the ligands used for the purpose of the present invention, was carried out through a Carlo Erba automatic analyzer Mod. 1106.

$^{13}$C-NMR and $^1$H-NMR Spectra

The $^{13}$C-NMR and $^1$H-NMR spectra were recorded through a nuclear magnetic resonance spectrometer mod. Bruker Avance 400, using deuterated tetrachloroethylene ($C_2D_2Cl_4$) at +103° C., and hexamethyldisilazane (HDMS) as internal standard. For this purpose, polymeric solutions were used with concentrations equal to 10% by weight with respect to the total weight of the polymeric solution.

The microstructure of the polyisoprenes obtained [i.e. cis-1,4(%) and 3,4(%) unit content] was determined through the analysis of the aforesaid spectra based on the indications reported in literature by Ricci G. et al, "*Macromolecules*" (2009), Vol. 42(23), pp. 9263-9267, mentioned above.

Figure 1B:
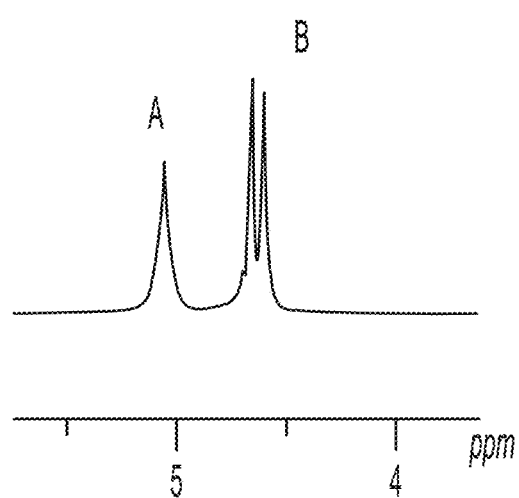
FIG. 1B shows a $^{1}$H-NMR spectrum of a polyisoprene with a mainly alternating cis-1,4-alt-3,4 structure.
Figure 2:
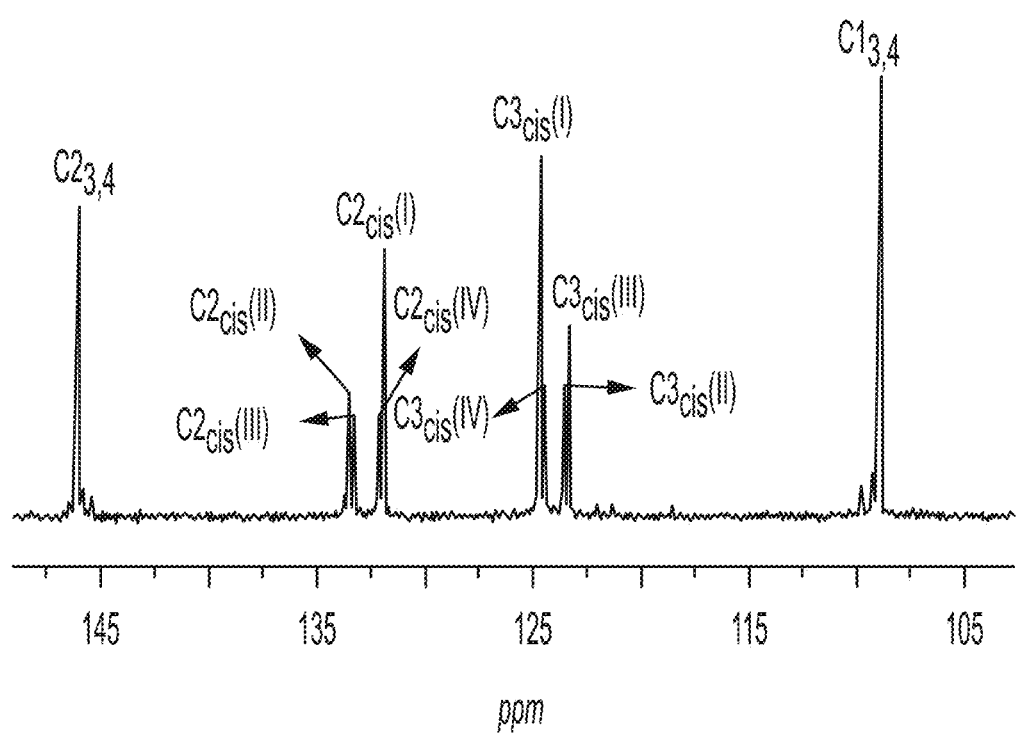
FIG. 2 shows a $^{13}$C-NMR spectrum (olefinic zone) of a polyisoprene with a mainly alternating cis-1,4-alt-3,4 structure.
Figure 3A:
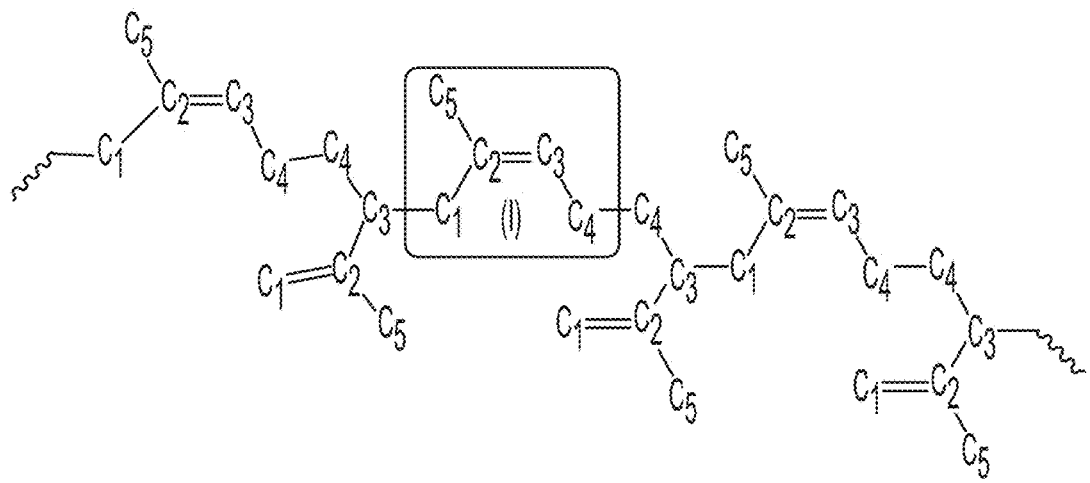
FIG. 3A shows an alternating cis-1,4-alt-3,4 sequence.
Figure 3B:
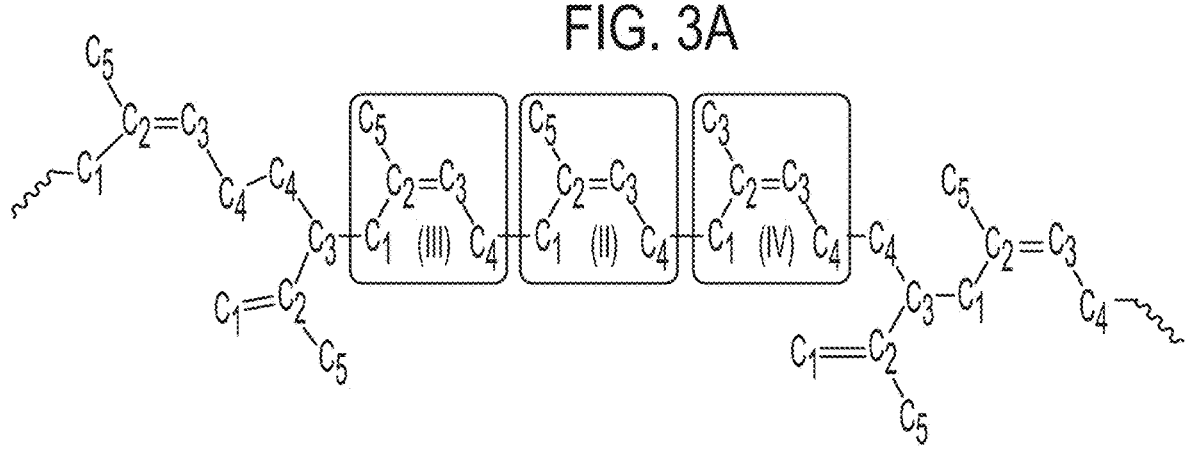
FIG. 3B shows a cis-1,4 sequence within an alternating structure.

For that purpose:

FIG. 1B shows, by way of example, the $^1$H-NMR spectrum of the polyisoprene with a mainly alternating cis-1,4-alt-3,4 structure obtained in Example 9 reported below from which it is possible to determine the microstructure of said polyisoprene; specifically, only the olefinic zone related to the olefinic protons of the isoprene units with a cis-1,4 and 3,4 structure is shown: the percentage of units with a 3,4 structure can be obtained from the following equation:

$$\%3,4=[B/(2A+B)]\times 100$$

wherein B represents the area of the peaks related to the two olefinic protons with a 3,4 structure, and A represents the area of the peak related to the only olefinic proton of the unit with a cis-1,4 structure;

FIG. 2 shows, by way of example, the $^{13}$C-NMR spectrum (olefinic zone) of the polyisoprene with a mainly alternating cis-1,4-alt-3,4 structure obtained in Example 9 reported below; from such spectrum, it is possible to determine the way wherein the isoprene units with a cis-1,4 and 3,4 structure are distributed along the polymer chain; in fact, only one signal is observed for each of the two olefinic carbons of the isoprene units with a 3,4 structure, indicating that such isoprene units with a 3,4 structure, only experience a single type of environment and, precisely, are only inserted in an alternating cis-1,4-alt-3,4 structure (FIG. 3A), while 4 different signals are observed for each of the two olefinic carbons of the isoprene units with a cis-1,4 structure, indicating that such isoprene units with a cis-1,4 structure experience 4 different environments (FIG. 3B).

I.R. Spectra

The I.R. (FT-IR) spectra were recorded through Thermo Nicolet Nexus 670 and Bruker IFS 48 spectrophotometers.

The I.R. (FT-IR) spectra of the polyisoprenes obtained were determined by the analysis of polymeric films on potassium bromide (KBr) tablets, said films being obtained through the deposition of a solution in hot 1,2-dichlorobenzene of the polymer to be analyzed. The concentration of the polymeric solutions analyzed was equal to 10% by weight with respect to the total weight of the polymeric solution.

Determination of the Molecular Weight

The determination of the molecular weight (MW) of the polyisoprenes obtained was carried out through GPC ("Gel Permeation Chromatography"), using the Waters® Alliance® GPC/V 2000 System by Waters Corporation which uses two detection lines: Refractive Index (RI) and Viscometer operating under the following conditions:

two PLgel Mixed-B columns;

solvent/eluent: o-dichlorobenzene (Aldrich);

flow rate: 0.8 ml/min;

temperature: +145° C.;

molecular mass calculation: Universal Calibration method.

The weight-average molecular weight ($M_w$) and the Polydispersion Index (PDI) corresponding to the ratio $M_w/M_n$ ($M_n$=number-average molecular weight) are reported.

Differential Scanning calorimetry (DSC)

Differential Scanning calorimetry analysis, for the purpose of determining the glass transition temperature ($T_g$) of the polymers obtained, was carried out through a Perkin Elmer Pyris differential scanning calorimeter. For that purpose, 5 mg of polymer were analyzed, with a scanning speed ranging from +1° C./min to +20° C./min, in an inert nitrogen atmosphere.

Example 1

Synthesis of Ligand Having Formula (L1)

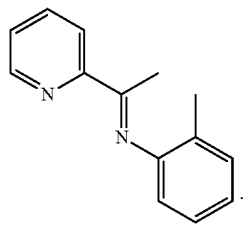

(L1)

In a 250 ml flask, 2-acetylpyridine (9.1 g, 75 mmoles) and some drops of formic acid were added to a solution of o-toluidine (8 g, 75 mmoles) in methanol (100 ml): the mixture obtained was left, under stirring, at ambient temperature, for 48 hours. Subsequently, the solvent was removed through vacuum evaporation and the residue obtained was purified through elution on a silica gel chromatography column [eluent: mixture of heptane/ethyl acetate in ratio of 99/1 (v/v)], obtaining 6.5 g of a light yellow oil (yield=40%) corresponding to the ligand having formula (L1).

Molecular weight (MW): 210.28.

Elementary analysis [found (calculated for $C_{14}H_{14}N_2$)]: C: 80.00% (79.97%); H: 6.77% (6.71%); N: 13.41% (13.32%).

$^1$H-NMR (CDCl$_3$, δ ppm) 8.70 (m, 1H, HPy), 8.41 (m, 1H HPy), 7.80 (td, 1H, HPy), 7.39 (dt, 1H, HPy), 7.27-7.18 (m, 2H, Ph), 7.02 (m, 1H, Ph), 6.69 (d, 1H, Ph), 2.30 (s, 3H, N=C—CH$_3$), 2.10 (s, 3H, Ph-CH$_3$).

Example 2

Synthesis of Ligand Having Formula (L2)

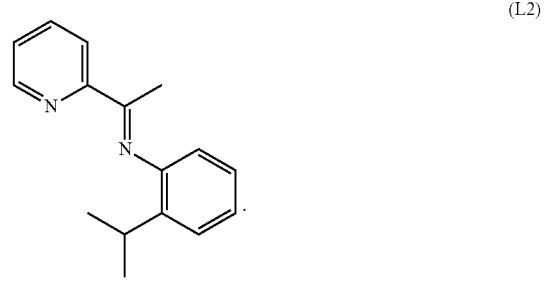

(L2)

In a 250 ml flask, 2-acetylpiridine (3.78 g; 31.1 mmoles) and p-toluenesulfonic acid monohydrate (0.15 g; 0.81 mmoles) were added to a solution of 2-iso-propylaniline (4.20 g; 31.1 mmoles) in toluene (20 ml): the mixture obtained was heated under reflux, for 2 hours. Subsequently, the solvent was removed through vacuum evaporation and the residue obtained was purified through vacuum distillation, obtaining 5.89 g of an orange oil (yield=79%) corresponding to the ligand having formula (L2).

Molecular weight (MW): 238.33.

Elementary analysis [found (calculated for $C_{16}H_{18}N_2$)]: C: 80.17% (80.63%); H: 7.80% (7.61%); N: 11.91% (11.75%).

$^1$H-NMR (CDCl$_3$, δ ppm) 8.71 (d, 1H), 8.37 (d, 1H), 7.81 (t, 1H), 7.38 (m, 2H), 7.22 (t, 1H), 7.15 (t, 1H), 6.67 (d, 1H), 3.05 (sept, 1H), 2.39 (s, 3H), 1.23 (d, 6H).

Example 3

Synthesis of FeCl$_3$(L1) [Sample MG213]

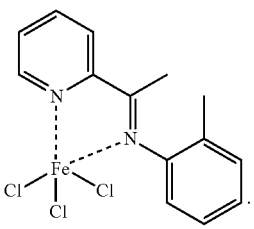

(MG213)

In a 100 ml flask, to a solution of the ligand having formula (L1) (293 mg; 1.39 mmoles), obtained as described in Example 1, in toluene (20 ml), iron (III) chloride (FeCl$_3$) (225 mg; 1.39 mmoles; molar ratio L1/Fe=1) was added: the mixture obtained was maintained, under stirring, at ambient temperature, for 3 hours. The supernatant was then removed through evaporation at reduced pressure and the residue obtained was washed with heptane (2×15 ml) and vacuum dried, at ambient temperature, obtaining 396 mg of a brown solid product corresponding to the complex FeCl$_3$(L1), equal to a 76% conversion with respect to the iron (III) chloride (FeCl$_3$) loaded.

Molecular weight (MW): 372.48.

Elementary analysis [found (calculated for $C_{14}H_{14}Cl_3FeN_2$)]: C: 45.00% (45.14%), H: 3.69% (3.79%), N: 7.69% (7.52%), Cl: 28.96% (28.55%), Fe: 15.09% (14.99%).

Example 4

Synthesis of FeCl₃(L2) [Sample MG208]

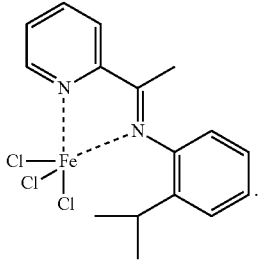

(MG208)

In a 100 ml flask, to a solution of the ligand having formula (L2) (514 mg; 2.16 mmoles), obtained as described in Example 2, in toluene (20 ml), iron (III) chloride (FeCl₃) (350 mg; 2.16 mmoles; molar ratio L2/Fe=1) was added: the mixture obtained was maintained, under stirring, at ambient temperature, for 3 hours. The supernatant was then removed through evaporation at reduced pressure and the residue obtained was washed with heptane (2×15 ml) and vacuum dried, at ambient temperature, obtaining 821 mg of a red solid product corresponding to the complex FeCl₃(L2), equal to a 95% conversion with respect to the iron (III) chloride (FeCl₃) loaded.

Molecular weight (MW): 400.53.

Elementary analysis [found (calculated for $C_{16}H_{18}Cl_3FeN_2$)]: C: 48.09% (47.97%), H: 4.71% (4.53%), N: 6.65% (6.99%), Cl: 25.96% (26.55%), Fe: 14.08% (13.94%).

Example 5

Synthesis of FeCl₂(L1) [Sample MG215]

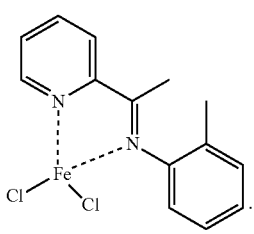

(MG215)

In a 100 ml flask, to a solution of the ligand having formula (L1) (527 mg; 2.51 mmoles), obtained as described in Example 1, in toluene (20 ml), iron (II) chloride (FeCl₂) (319 mg; 2.51 mmoles; molar ratio L1/Fe=1) was added: the mixture obtained was maintained, under stirring, at +100° C., for 3 hours. The supernatant was then removed through evaporation at reduced pressure and the residue obtained was washed with heptane (2×15 ml) and vacuum dried, at ambient temperature, obtaining 521 mg of a light blue solid product corresponding to the complex FeCl₂(L1), equal to a 62% conversion with respect to the iron (II) chloride (FeCl₂) loaded.

Molecular weight (MW): 337.03

Elementary analysis [found (calculated for $C_{14}H_{14}Cl_2FeN_2$)]: C: 49.10% (49.89%), H: 4.38% (4.19%), N: 8.21% (8.31%), Cl: 21.42% (21.04%), Fe: 16.82% (16.57%).

Example 6

Synthesis of FeCl₂(L2) [sample MG212]

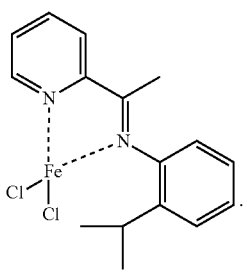

(MG212)

In a 100 ml flask, to a solution of the ligand having formula (L2) (540 mg; 2.27 mmoles), obtained as described in Example 2, in toluene (20 ml), iron (II) chloride (FeCl₂) (288 mg; 2.27 mmoles; molar ratio L2/Fe=1) was added: the mixture obtained was maintained, under stirring, at +100° C., for 3 hours. The supernatant was then removed through evaporation at reduced pressure and the residue obtained was washed with heptane (2×15 ml) and vacuum dried, at ambient temperature, obtaining 665 mg of a light blue solid product corresponding to the complex FeCl₂(L2), equal to a 80% conversion with respect to the iron (II) chloride (FeCl₂) loaded.

Molecular weight (MW): 365.08.

Elementary analysis [found (calculated for $C_{16}H_{18}Cl_2FeN_2$)]: C: 52.12% (52.64%), H: 4.65% (4.96%), N: 7.26% (7.67%), Cl: 19.02% (19.42%), Fe: 15.04% (15.30%).

Example 7 (ZG189)

2 ml of isoprene equal to about 1.36 g were placed in a 25 ml test tube. Subsequently, 14 ml of toluene were added and the temperature of the solution thus obtained was brought to +20° C. Then, methylaluminoxane (MAO) in toluene solution (0.315 ml; 5×10⁻⁴ moles, equal to about 0.029 g) was added and, subsequently, the FeCl₂(L1) complex [sample MG215] (1.7 ml of toluene solution at a concentration of 2 mg/ml; 1×10⁻⁵, equal to about 3.37 mg) obtained as described in Example 5. Everything was kept under magnetic stirring, at ambient temperature, for 5 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene for a conversion equal to 100%, having a mainly alternating cis-1,4/3,4 structure: further characteristics of the process and of the polyisoprene obtained are reported in Table 1.

Figure 4:
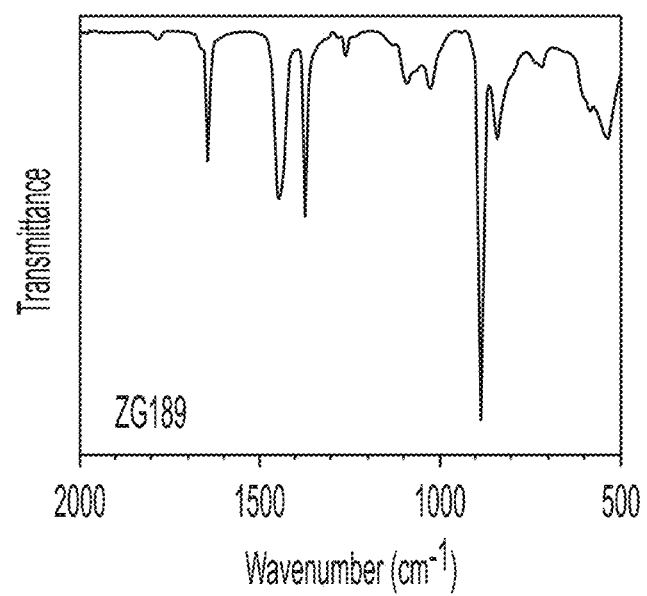
FIG. 4 shows an FT-IR spectrum of a polyisoprene obtained according to the disclosure.

FIG. 4 shows the FT-IR spectrum of the polyisoprene obtained.

Figure 5:
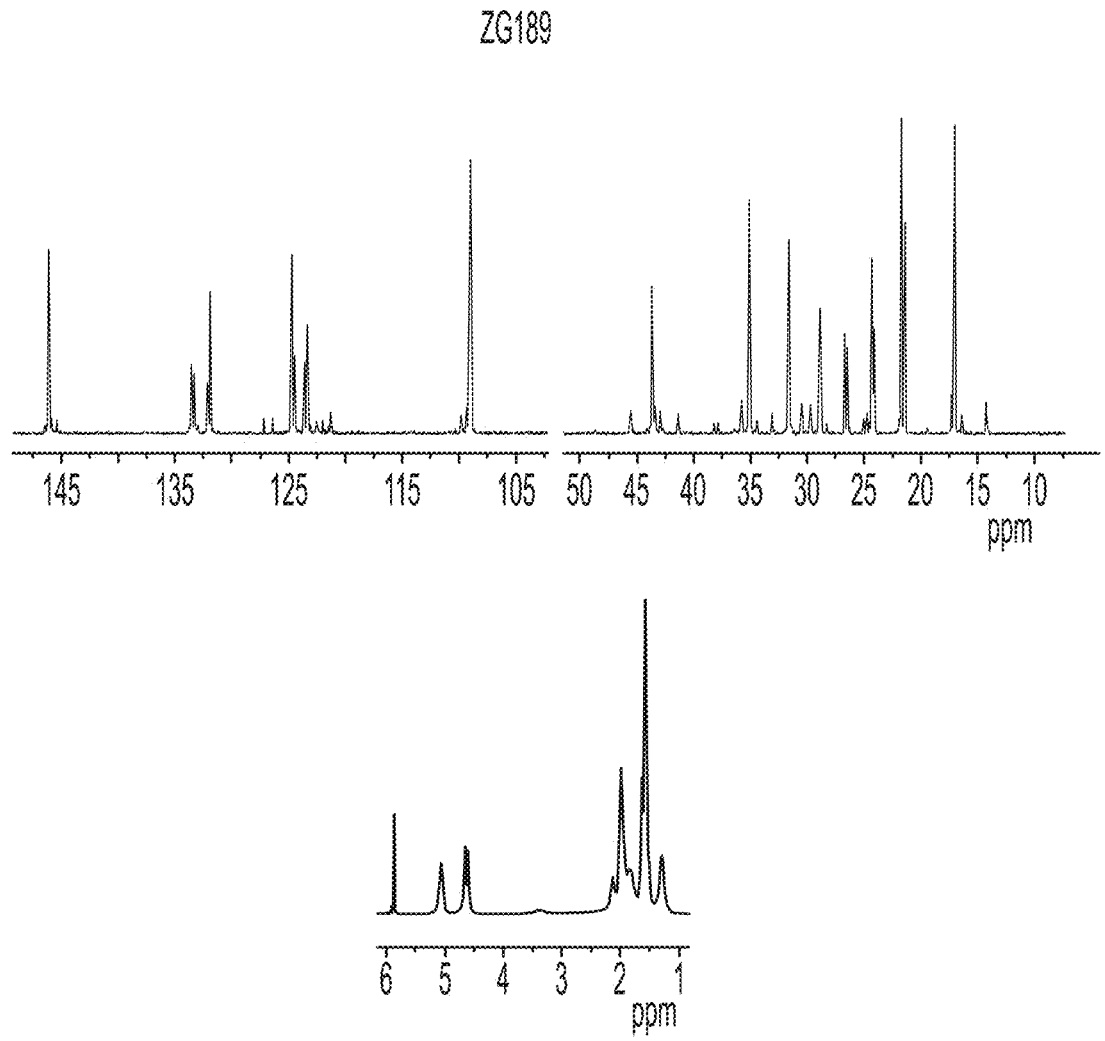
FIG. 5 shows a $^{1}$H-NMR (top) and $^{13}$C-NMR (bottom) spectra of the polyisoprene of FIG. 4.

FIG. 5 shows the $^1$H-NMR (top) and $^{13}$C-NMR (bottom) spectra of the polyisoprene obtained. Table 2 shows the attribution of the different peaks present in the olefinic zone of the $^{13}$C-NMR spectrum.

Example 8 (ZG188)

2 ml of isoprene equal to about 1.36 g were placed in a 25 ml test tube. Subsequently, 13.82 ml of toluene were added and the temperature of the solution thus obtained was brought to +20° C. Then, methylaluminoxane (MAO) in toluene solution (0.315 ml; $5\times10^{-4}$ moles, equal to about 0.029 g) was added and, subsequently, the FeCl$_2$(L2) complex [sample MG212] (1.87 ml of toluene solution at a concentration of 2 mg/ml; $1\times10^{-5}$, equal to about 3.74 mg) obtained as described in Example 6. Everything was kept under magnetic stirring, at ambient temperature, for 10 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene for a conversion equal to 100%, having a mainly alternating cis-1,4/3,4 structure: further characteristics of the process and of the polyisoprene obtained are reported in Table 1.

Figure 6:
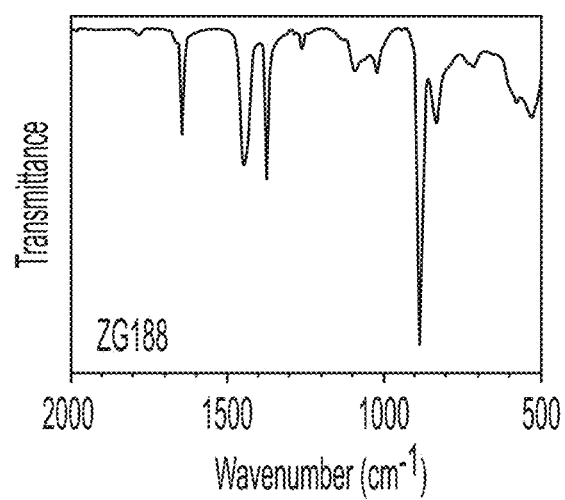
FIG. 6 shows an FT-IR spectrum of another polyisoprene obtained according to the disclosure.

FIG. 6 shows the FT-IR spectrum of the polyisoprene obtained.

Figure 7:
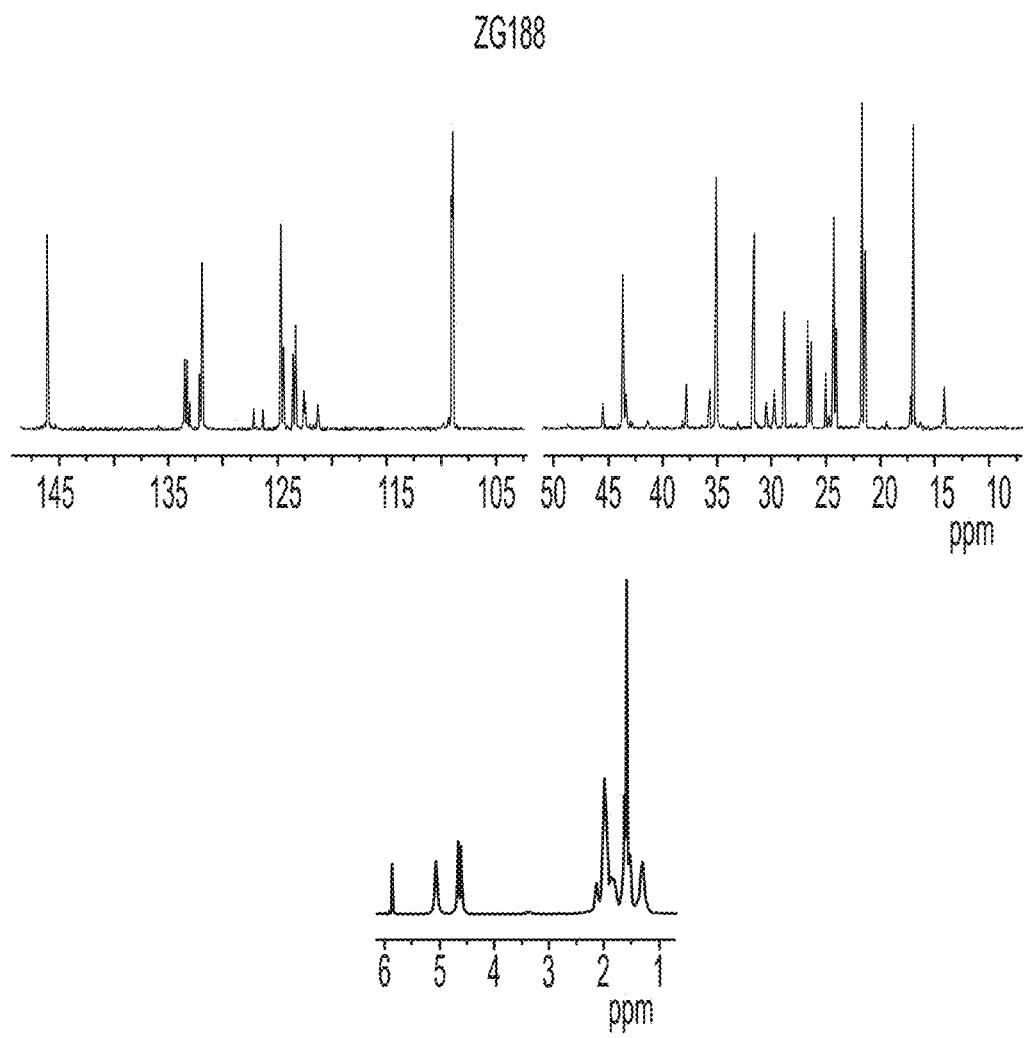
FIG. 7 shows a $^{1}$H-NMR (bottom) and an $^{13}$C-NMR (top) spectra of the polyisoprene of FIG. 6.

FIG. 7 shows the $^1$H-NMR (bottom) and $^{13}$C-NMR (top) spectra of the polyisoprene obtained. Table 2 shows the attribution of the different peaks present in the olefinic zone of the $^{13}$C-NMR spectrum.

Example 9 (IP294)

5 ml of isoprene equal to about 3.4 g were placed in a 100 ml test tube. Subsequently, 31.3 ml of toluene were added and the temperature of the solution thus obtained was brought to –10° C. Then, methylaluminoxane (MAO) in toluene solution (0.13 ml; $2\times10^{-4}$ moles, equal to about 0.012 g) was added and, subsequently, the FeCl$_2$(L2) complex [sample MG212] (3.6 ml of toluene solution at a concentration of 2 mg/ml; $2\times10^{-5}$, equal to about 7.3 mg) obtained as described in Example 6. Everything was kept under magnetic stirring, at ambient temperature, for 240 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 2.49 g of polyisoprene for a conversion equal to 73.2%, having an alternating cis-1,4/3,4 structure: further characteristics of the process and of the polyisoprene obtained are reported in Table 1.

Figure 8:
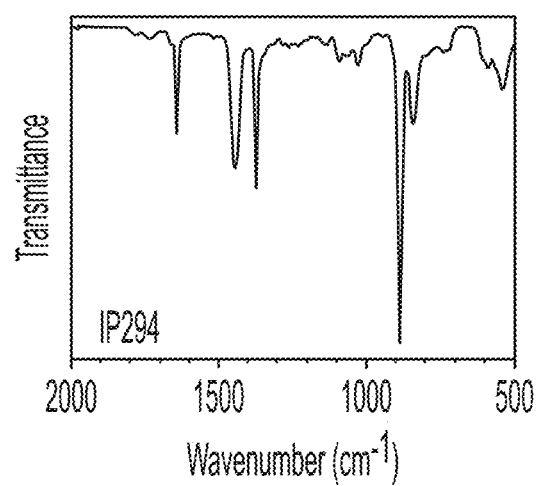
FIG. 8 shows an FT-IR spectrum of another polyisoprene obtained according to the disclosure.

FIG. 8 shows the FT-IR spectrum of the polyisoprene obtained.

Figure 9:
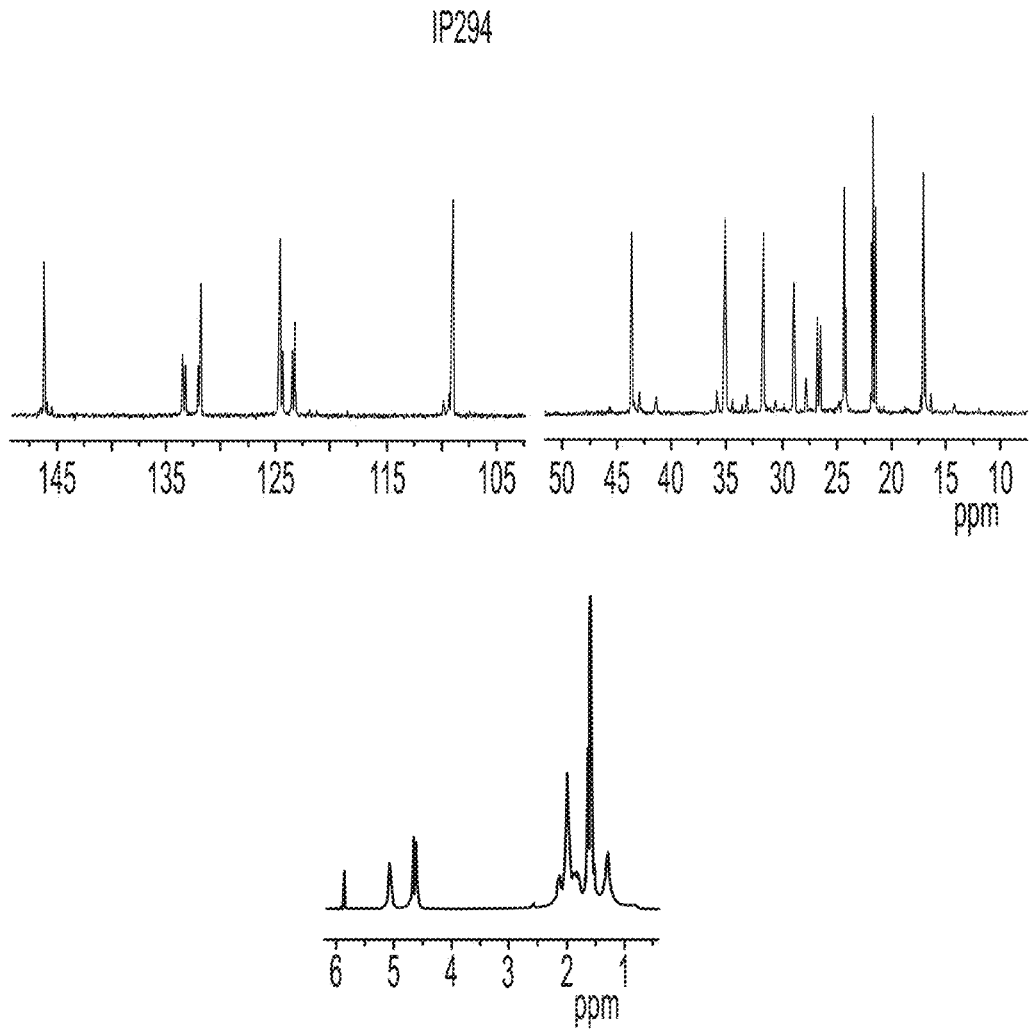
FIG. 9 shows a $^{1}$H-NMR (top) and $^{13}$C-NMR (bottom) spectra of the polyisoprene of FIG. 8.

FIG. 9 shows the $^1$H-NMR (top) and $^{13}$C-NMR (bottom) spectra of the polyisoprene obtained. Table 2 shows the attribution of the different peaks present in the olefinic zone of the $^{13}$C-NMR spectrum.

Example 10 (IP295)

5 ml of isoprene equal to about 3.4 g were placed in a 100 ml test tube. Subsequently, 31.3 ml of heptane were added and the temperature of the solution thus obtained was brought to +25° C. Then, methylaluminoxane (MAO) in toluene solution (0.13 ml; $2\times10^{-4}$ moles, equal to about 0.012 g) was added and, subsequently, the FeCl$_2$(L2) complex [sample MG212] (3.6 ml of toluene solution at a concentration of 2 mg/ml; $2\times10^{-5}$, equal to about 7.3 mg) obtained as described in Example 6. Everything was kept under magnetic stirring, at ambient temperature, for 360 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 3.4 g of polyisoprene for a conversion equal to 100%, having an alternating cis-1,4/3,4 structure: further characteristics of the process and of the polyisoprene obtained are reported in Table 1.

Figure 10:
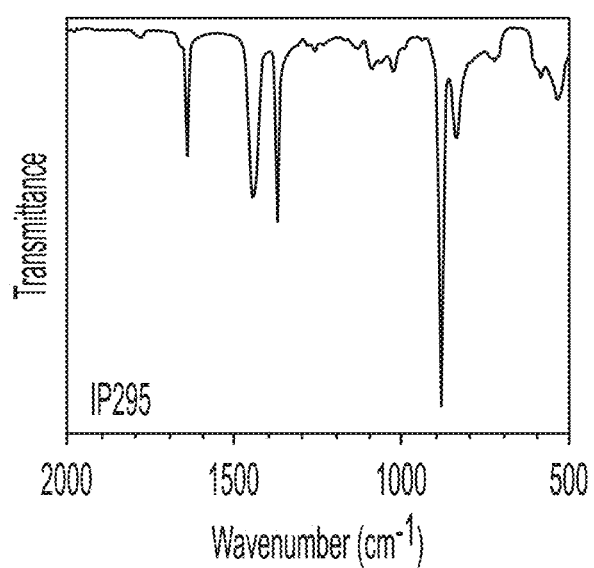
FIG. 10 shows an FT-IR spectrum of another polyisoprene obtained according to the disclosure.

FIG. 10 shows the FT-IR spectrum of the polyisoprene obtained.

Figure 11:
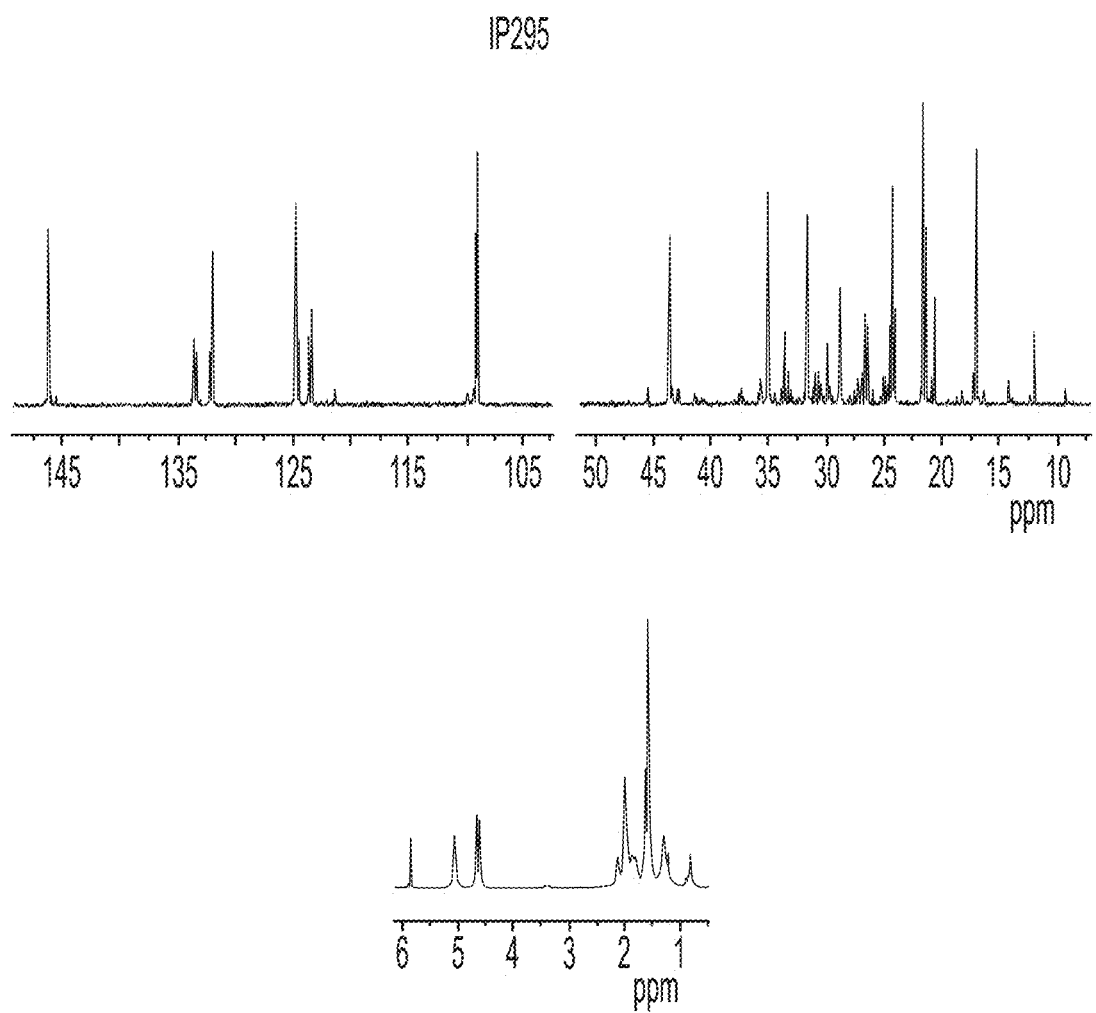
FIG. 11 shows a $^{1}$H-NMR (top) and $^{13}$C-NMR (bottom) spectra of the polyisoprene of FIG. 10.

FIG. 11 shows the $^1$H-NMR (top) and $^{13}$C-NMR (bottom) spectra of the polyisoprene obtained. Table 2 shows the attribution of the different peaks present in the olefinic zone of the $^{13}$C-NMR spectrum.

Example 11 (IP205/A)

2 ml of isoprene equal to about 1.36 g were placed in a 25 ml test tube. Subsequently, 13.82 ml of toluene were added and the temperature of the solution thus obtained was brought to +20° C. Then, methylaluminoxane (MAO) in toluene solution (0.315 ml; $5\times10^{-4}$ moles, equal to about 0.029 g) was added and, subsequently, the FeCl$_3$(L1) complex [sample MG213] (1.87 ml of toluene solution at a concentration of 2 mg/ml; $1\times10^{-5}$, equal to about 3.74 mg) obtained as described in Example 3. Everything was kept under magnetic stirring, at ambient temperature, for 5 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene for a conversion equal to 100%, having an alternating cis-1,4/3,4 structure: further characteristics of the process and of the polyisoprene obtained are reported in Table 1.

Figure 12:
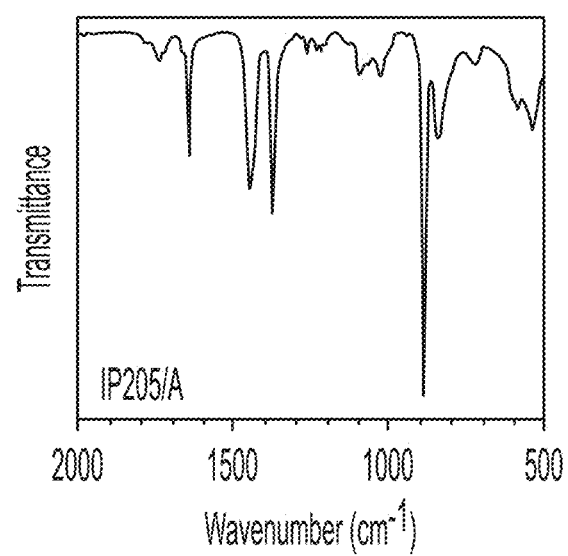
FIG. 12 shows an FT-IR spectrum of another polyisoprene obtained according to the disclosure.

FIG. 12 shows the FT-IR spectrum of the polyisoprene obtained.

Figure 13:
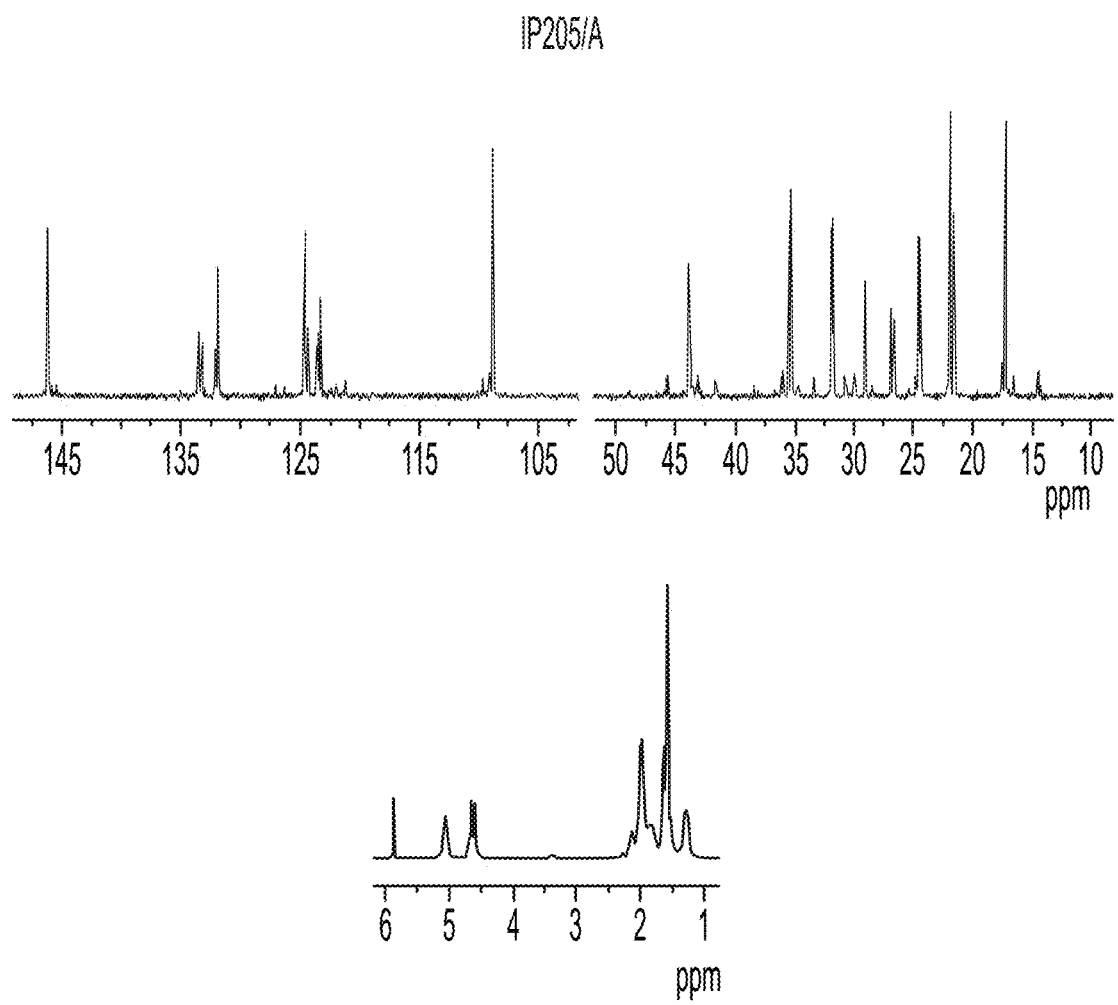
FIG. 13 shows a $^{1}$H-NMR (top) and $^{13}$C-NMR (bottom) spectra of the polyisoprene of FIG. 12.

FIG. 13 shows the $^1$H-NMR (top) and $^{13}$C-NMR (bottom) spectra of the polyisoprene obtained. Table 2 shows the attribution of the different peaks present in the olefinic zone of the $^{13}$C-NMR spectrum.

Example 12 (IP206/A)

2 ml of isoprene equal to about 1.36 g were placed in a 25 ml test tube. Subsequently, 13.72 ml of toluene were added and the temperature of the solution thus obtained was brought to +20° C. Then, methylaluminoxane (MAO) in toluene solution (0.315 ml; $5\times10^{-4}$ moles, equal to about 0.029 g) was added and, subsequently, the FeCl$_3$(L2) complex [sample MG208] (2 ml of toluene solution at a concentration of 2 mg/ml; $1\times10^{-5}$, equal to about 4 mg) obtained as described in Example 4. Everything was kept under magnetic stirring, at ambient temperature, for 5 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene for a conversion equal to 100%, having an alternating cis-1,4/3,4 structure: further characteristics of the process and of the polyisoprene obtained are reported in Table 1.

Figure 14:
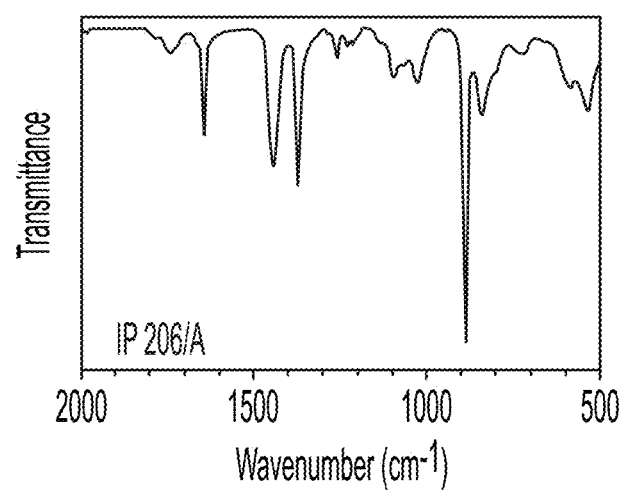
FIG. 14 shows an FT-IR spectrum of another polyisoprene obtained according to the disclosure.

FIG. 14 shows the FT-IR spectrum of the polyisoprene obtained.

Figure 15:
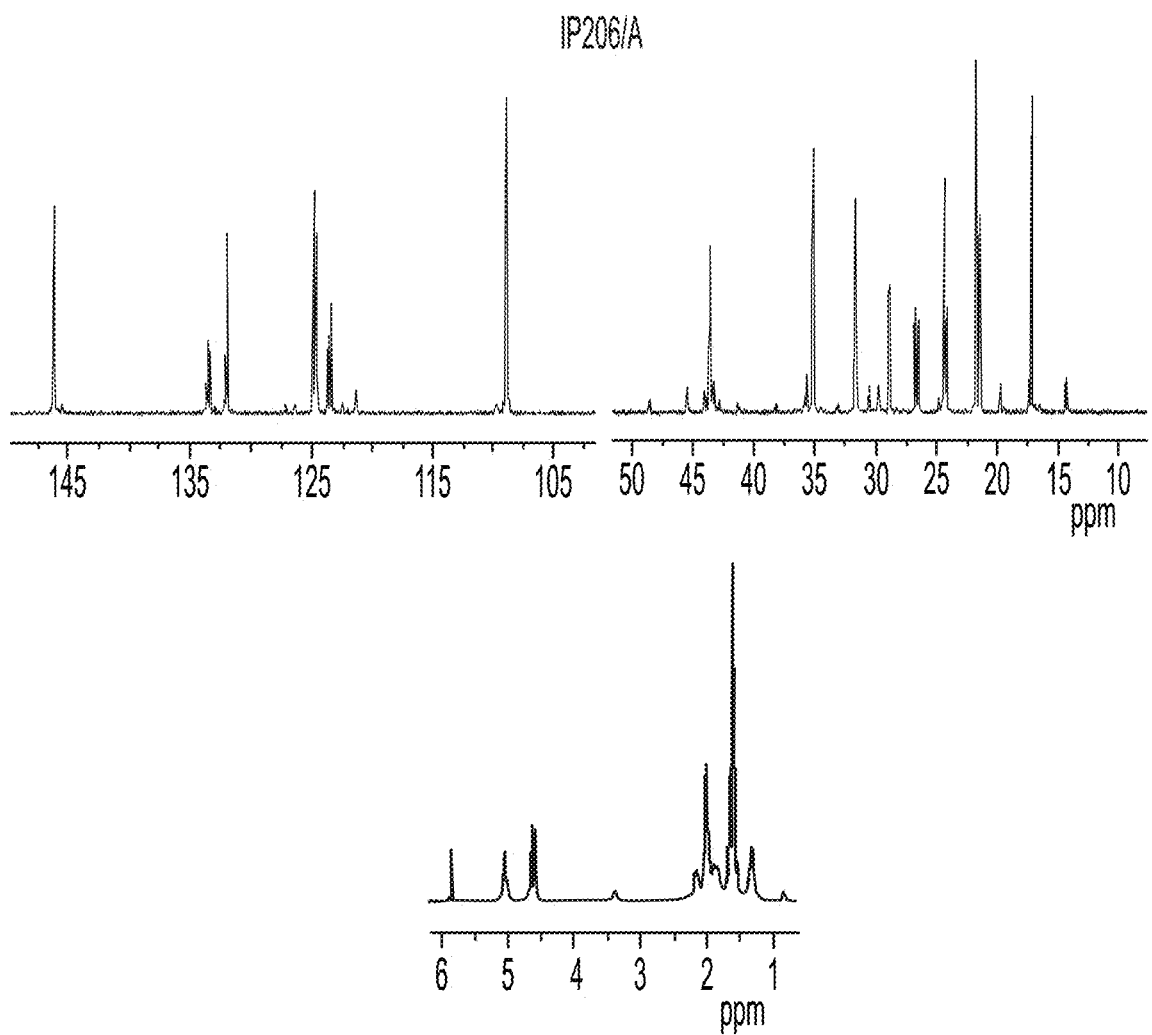
FIG. 15 shows a $^{1}$H-NMR (top) and $^{13}$C-NMR (bottom) spectra of the polyisoprene of FIG. 14.

FIG. 15 shows the $^1$H-NMR (top) and $^{13}$C-NMR (bottom) spectra of the polyisoprene obtained. Table 2 shows the attribution of the different peaks present in the olefinic zone of the $^{13}$C-NMR spectrum.

Example 13 (IP271)

2 ml of isoprene equal to about 1.36 g were placed in a 25 ml test tube. Subsequently, 13.9 ml of heptane were added and the temperature of the solution thus obtained was brought to +20° C. Then, methylaluminoxane (MAO) in toluene solution (0.063 ml; 1×10$^{-4}$ moles, equal to about 0.058 g) was added and, subsequently, the FeCl$_3$(L2) complex [sample MG208] (2 ml of toluene solution at a concentration of 2 mg/ml; 1×10$^{-5}$, equal to about 4 mg) obtained as described in Example 4. Everything was kept under magnetic stirring, at ambient temperature, for 20 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 0.544 g of polyisoprene for a conversion equal to 40%, having an alternating cis-1,4/3,4 structure: further characteristics of the process and of the polyisoprene obtained are reported in Table 1.

Figure 16:
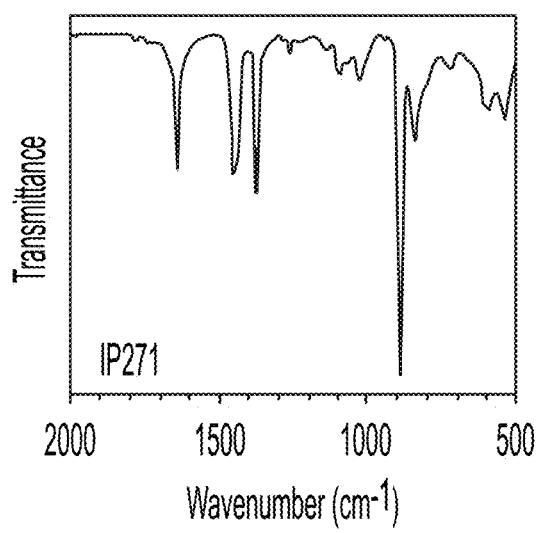
FIG. 16 shows an FT-IR spectrum of another polyisoprene obtained according to the disclosure.

FIG. 16 shows the FT-IR spectrum of the polyisoprene obtained.

Figure 17:
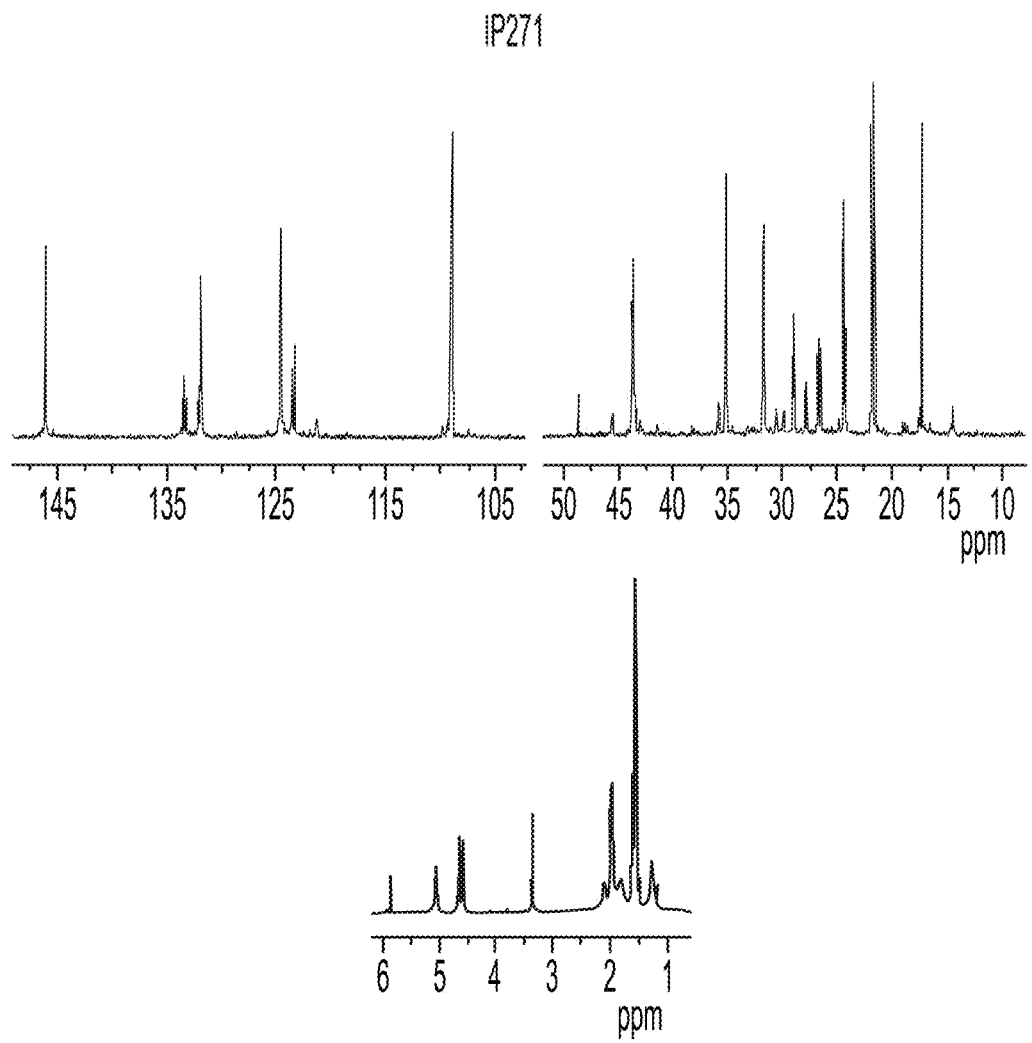
FIG. 17 shows a $^{1}$H-NMR (top) and $^{13}$C-NMR (bottom) spectra of the polyisoprene of FIG. 16.

FIG. 17 shows the $^1$H-NMR (top) and $^{13}$C-NMR (bottom) spectra of the polyisoprene obtained. Table 2 shows the attribution of the different peaks present in the olefinic zone of the $^{13}$C-NMR spectrum.

Example 14 (IP269)

2 ml of isoprene equal to about 1.36 g were placed in a 25 ml test tube. Subsequently, 13.4 ml of toluene were added and the temperature of the solution thus obtained was brought to +20° C. Then, tri-iso-butylaluminum (TIBA) (0.07 ml; 3×10$^{-4}$ moles, equal to about 0.0595 g) was added and, subsequently, the FeCl$_3$(L2) complex [sample MG208] (1.87 ml of toluene solution at a concentration of 2 mg/ml; 1×10$^{-5}$, equal to about 3.74 mg) obtained as described in Example 4. Everything was kept under magnetic stirring, at ambient temperature, for 2880 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 0.481 g of polyisoprene for a conversion equal to 35.4%, having an alternating cis-1,4/3,4 structure: further characteristics of the process and of the polyisoprene obtained are reported in Table 1.

Figure 18:
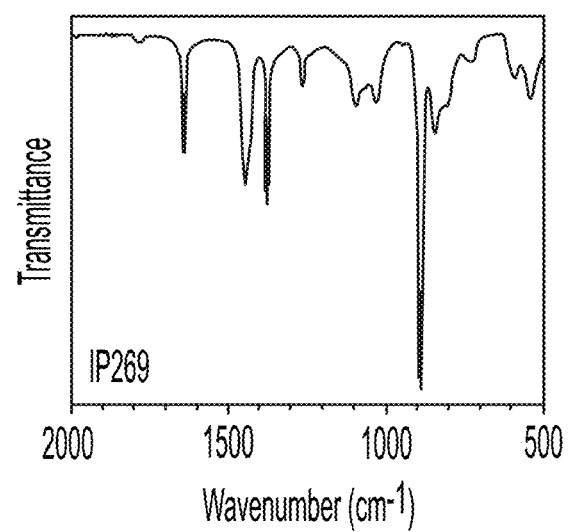
FIG. 18 shows an FT-IR spectrum of another polyisoprene obtained according to the disclosure.

FIG. 18 shows the FT-IR spectrum of the polyisoprene obtained.

Figure 19:
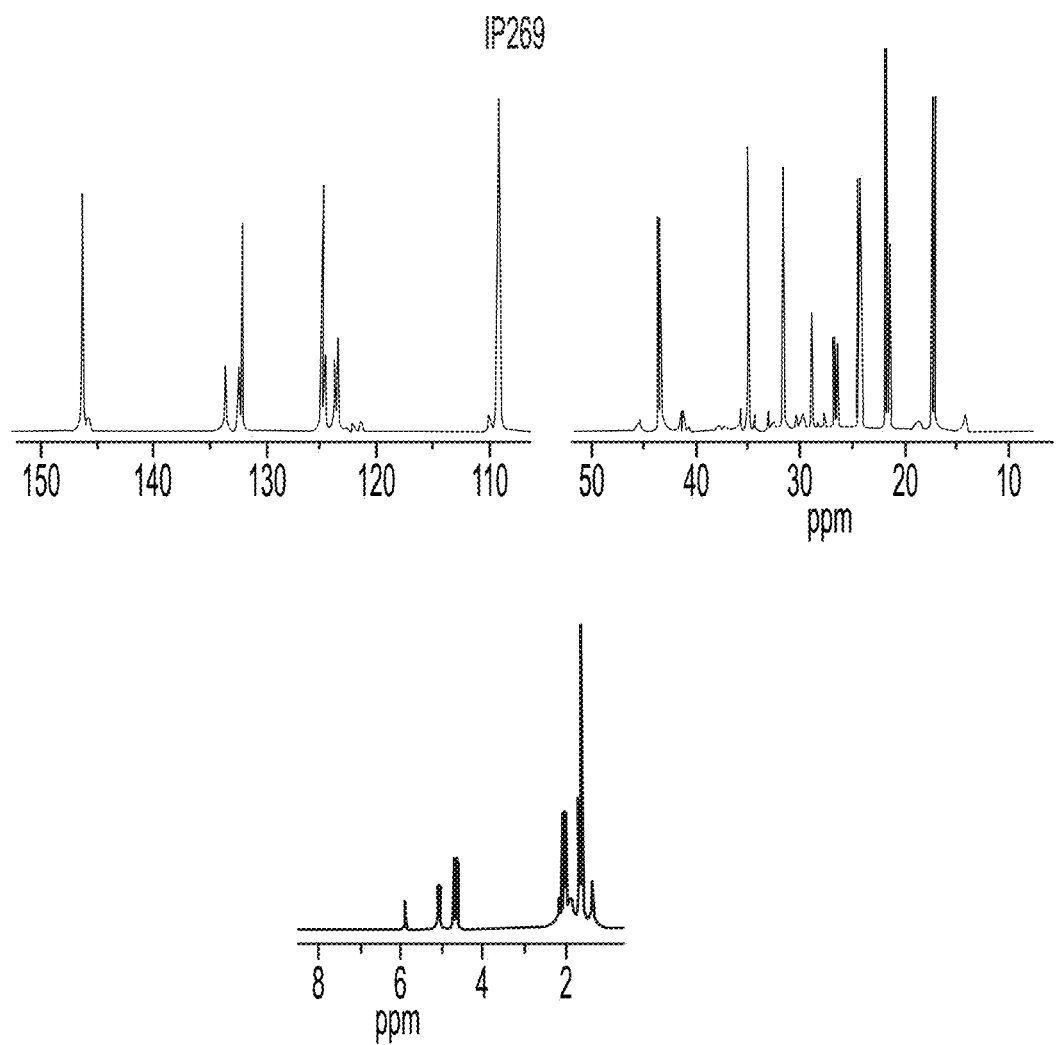
FIG. 19 shows a $^{1}$H-NMR (top) and $^{13}$C-NMR (bottom) spectra of the polyisoprene of FIG. 18.

FIG. 19 shows the $^1$H-NMR (top) and $^{13}$C-NMR (bottom) spectra of the polyisoprene obtained. Table 2 shows the attribution of the different peaks present in the $^{13}$C-NMR spectrum.

Example 15

Synthesis of the Catalytic System AlEt$_2$Cl/Nd(OCOC$_7$H$_{15}$)$_3$/Al($^i$Bu)$_3$ The catalytic system AlEt$_2$Cl/Nd(OCOC$_7$H$_{15}$)$_3$/Al($^i$Bu)$_3$ was prepared as described in Ricci G. et al, "*Polymer Communications*" (1987), Vol. 28, Issue 8, pp. 223-226, mentioned above.

For that purpose, neodymium 2-ethylhexanoate [Nd(OCOC$_7$H$_{15}$)$_3$] (2.38×10$^{-4}$ moles; 0.136 grams) and heptane (9.6 ml) were placed into a 25 ml test tube. The solution thus obtained, was kept, under stirring, at ambient temperature, for 1 hour. Subsequently, diethylaluminum chloride (AlEt$_2$Cl) in heptane solution [7.5×10$^{-3}$ moles; 0.09 grams; 0.47 ml of a heptane solution 1/5 (v/v)] was added, drop by drop: a white/light blue suspension was formed which was kept, under vigorous stirring, for 15 minutes. Subsequently, tri-iso-butylaluminum (TIBA) (7.1×10$^{-3}$ moles; 1.42 grams; 1.8 ml) was added: everything was kept, under stirring, at ambient temperature for 24 hours, obtaining a solution of the catalytic system AlEt$_2$Cl/Nd(OCOC$_7$H$_{15}$)$_3$/Al($^i$Bu)$_3$ having a concentration of neodymium equal to 0.02 M.

Example 16 (Comparative)

Synthesis of Polyisoprene Having a Mainly Cis-1,4 Structure 2 ml of isoprene equal to about 1.36 g were placed into a 25 ml test tube. Subsequently 15.5 ml of heptane were added and the temperature of the solution thus obtained was brought to +0° C. Then the catalytic system AlEt$_2$Cl/Nd(OCOC$_7$H$_{15}$)$_3$/Al($^i$Bu)$_3$ (0.25 ml of heptane solution having a concentration of neodymium equal to 0.02 M; 5×10$^{-6}$ moles) was added, obtained as described in Example 15. Everything was kept under magnetic stirring, at +0° C., for 60 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.03 g of polyisoprene for a conversion equal to 75.7%, having a mainly cis-1,4 structure 97%).

FIG. 1A reports the $^{13}$C-NMR spectrum of the polyisoprene obtained. Table 2 shows the attribution of the different peaks present in the olefinic zone of the $^{13}$C-NMR spectrum.

Example 17 (Comparative)

Synthesis of Polyisoprene Having a Mainly Syndiotactic 3,4 Structure

The polyisoprene having a mainly syndiotactic 3,4 structure was obtained by operating as described in Ricci G. et al, "*Journal of Molecular Catatalysis A: Chemical*" (2003), 204-205, pp. 287-293, mentioned above For that purpose, 2 ml of isoprene equal to about 1.36 g and toluene (10.9 ml) were placed into a 25 ml test tube. The temperature of the solution thus obtained was brought to −30° C., then methylaluminoxane (MAO) in toluene solution (3.8 ml; 6×10$^{-3}$ moles, equal to about 0.348 g) was added and, subsequently the complex FeCl$_2$(bipy)$_2$ (1.3 ml of toluene solution at a concentration of 2 mg/ml; 6×10$^{-6}$ moles, equal to about 2.6 mg). Everything was kept under magnetic stirring, at −30° C., for 80 minutes. The polymerization was then quenched by adding 2 ml of methanol containing some drops of hydrochloric acid. The polymer obtained was then coagulated by adding 40 ml of a methanol solution containing 4% of Irganox® 1076 antioxidant (Ciba) obtaining 1.233 g of polyisoprene for a conversion equal to 90.5%, having a mainly syndiotactic 3,4 structure 80%).

FIG. 1A reports the $^{13}$C-NMR spectrum of the polyisoprene obtained. Table 2 shows the attribution of the different peaks present in the olefinic zone of the $^{13}$C-NMR spectrum.

Example 18 (Comparative)

Synthesis of Polyisoprene with a Perfectly Alternating Cis-1,4-Alt-3,4 Structure The polyisoprene with a perfectly alternating cis-1,4-alt-3,4 structure was obtained by operating as described in Ricci G. et al, "*Macromolecules*" (2009), Vol. 42(23), pp. 9263-9267, mentioned above.

For that purpose, 5 ml of isoprene equal to about 3.4 g were placed in a 50 ml test tube. Subsequently, 6.6 ml of toluene were added and the temperature of the solution thus obtained was brought to +22° C. Then, methylaluminoxane (MAO) in toluene solution (0.63 ml; $1 \times 10^{-3}$ moles, equal to about 0.058 g) was added and, subsequently, the $CoCl_2$ ($P''PrPh_2)_2$ complex (5.9 ml of toluene solution at a concentration of 1 mg/ml; $1 \times 10^{-5}$, equal to about 5.9 mg). Everything was kept under stirring, at ambient temperature, for 140 minutes. The polymerization was then quenched by adding 5 ml of methanol containing some drops of hydrochloric acid. The polymer obtained was then coagulated by adding 60 ml of a methanol solution containing 4% of Irganox® 1076 antioxidant (Ciba) obtaining 2.26 grams of polyisoprene for a conversion equal to 66.5%, having a perfectly alternating cis-1,4-alt-3,4 structure.

FIG. 1A reports the $^{13}C$-NMR spectrum of the polyisoprene obtained. Table 2 shows the attribution of the different peaks present in the olefinic zone of the $^{13}C$-NMR spectrum.

TABLE 1

Polymerization of isoprene with catalytic systems comprising pyridyl iron complexes

| Example | Al/Fe (molar ratio) | Time (min) | Conversion (%) | cis-1,4 (%) | 3.4 (%) | $M_w$ (g × $mol^{-1}$) | $M_w/M_n$ | $T_g$ (° C.) |
|---|---|---|---|---|---|---|---|---|
| 7 | 50 | 5 | 100 | 58.5 | 41.5 | 260800 | 1.8 | −29.7 |
| 8 | 50 | 10 | 100 | 59.3 | 40.7 | 244700 | 2.0 | −31.9 |
| 9 | 10 | 240 | 73.2 | 57.2 | 42.8 | 315700 | 1.7 | −30.2 |
| 10 | 10 | 360 | 100 | 58.2 | 41.8 | 120600 | 2.1 | −29.6 |
| 11 | 50 | 5 | 100 | 59.1 | 40.9 | 369900 | 1.9 | −29.3 |
| 12 | 50 | 5 | 100 | 57.7 | 42.3 | 355600 | 2.0 | −29.9 |
| 13 | 10 | 20 | 40 | 56.1 | 43.9 | 113700 | 2.2 | −29.0 |
| 14 | 30 | 2880 | 35.4 | 56.2 | 43.8 | 142900 | 2.1 | −28.1 |

TABLE 2

Attribution of the different peaks present in the olefinic zone of the $^{13}C$-NMR spectrum

| | cis-1,4 | | cis-3,4 | |
|---|---|---|---|---|
| Example | C2 | C3 | C1 | C2 |
| 16 (comparative) | 133.3 | 123.3 | — | — |
| 16 (comparative) | — | — | 110.0 | 145.3 |
| 16 (comparative) | 131.9 | 124.7 | 108.9 | 146.1 |
| 7-14 (invention) | 131.9 | 124.7 | 108.9 | 146.1 |
| | 133.3 | 123.3 | | |
| | 133.5 | 123.6 | | |
| | 131.1 | 124.4 | | |

The invention claimed is:

1. A process for the preparation of polyisoprene with a mainly alternating cis-1,4-alt-3,4 structure the process comprising:
  polymerizing isoprene in the presence of a catalytic system, the system comprising:
  (a) at least one pyridyl iron complex having general formula (I):

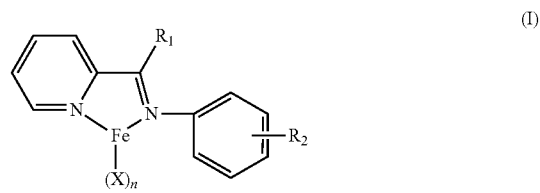

(I)

wherein:
$R_1$ is selected from linear or branched $C_1$-$C_{20}$ alkyl groups, optionally substituted cycloalkyl groups, and optionally substituted aryl groups;
$R_2$ is selected from linear or branched $C_1$-$C_{10}$ alkyl groups;
X, mutually identical or different, represents a halogen atom; or X is selected from linear or branched $C_1$-$C_{20}$ alkyl groups, —$OCOR_3$ groups and —$OR_3$ groups wherein $R_3$ is selected from linear or branched $C_1$-$C_{20}$ alkyl groups;

n is 2 or 3;
(b) at least one co-catalyst selected from (b1) aluminoxanes having general formula (II):

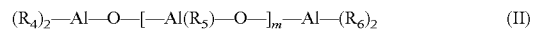

$(R_4)_2$—Al—O—[—Al($R_5$)—O—$]_m$—Al—$(R_6)_2$  (II)

wherein $R_4$, $R_5$ and $R_6$, mutually identical or different, represent a hydrogen atom or a halogen atom; or $R_4$, $R_5$ and $R_6$ are selected from linear or branched $C_1$-$C_{20}$ alkyl groups, cycloalkyl groups, and aryl groups, the groups being optionally substituted with one or more silicon or germanium atoms; and m is an integer ranging from 0 to 1000;
(b2) aluminum compounds having general formula (III):

Al($R_7$)($R_8$)($R_9$)  (III)

wherein $R_7$ represents a hydrogen atom, or is selected from linear or branched $C_1$-$C_{20}$ alkyl groups, cycloalkyl groups, aryl groups, alkylaryl groups, arylalkyl groups, alkoxy groups; $R_8$ and $R_9$, mutually identical or different, are selected from linear or branched $C_1$-$C_{20}$ alkyl groups, cycloalkyl groups, aryl groups, alkylaryl groups, and arylalkyl groups;

wherein the molar ratio between aluminum present in the co-catalyst and iron present in the pyridyl iron complex having general formula (I) ranges from 5 to 60.

2. The process according to claim 1, further comprising the pyridyl iron complex having general formula (I), wherein:
$R_1$ represents a methyl group, an ethyl group, an n-propyl group, or an iso-propyl group;
$R_2$ represents a methyl group, an ethyl group, an n-propyl group, or an iso-propyl group;
X, mutually identical, represents a halogen atom such as chlorine, bromine, or iodine atom; and
n is 2 or 3.

3. The process according to claim 1, wherein the aluminoxanes having general formula (II) are selected from: methylaluminoxane (MAO), ethylaluminoxane, n-butylaluminoxane, tetra-iso-butylaluminoxane (TIBAO), tert-butylaluminoxane, tetra-(2,4,4-trimethylpentyl)aluminoxane (TIOAO), tetra-(2,3-dimethylbutyl)aluminoxane (TDMBAO), tetra-(2,3,3-trimethylbutyl)aluminoxane (TTMBAO), and mixtures thereof.

4. The process according to claim 1, wherein the aluminum compounds having general formula (III) are selected from: diethylaluminum hydride, di-n-propylaluminum hydride, di-n-butylaluminum hydride, di-iso-butyl-aluminum hydride (DIBAH), diphenylaluminum hydride, di-p-tolylaluminum hydride, dibenzyl aluminum hydride, diethylaluminum hydride, phenyl-n-propylaluminum hydride, p-tolylethylaluminum hydride, p-tolyl-n-propylaluminum hydride, p-tolyl-iso-propylaluminum hydride, benzylethylaluminum hydride, benzyl-n-propylaluminum hydride, benzyl-iso-propylaluminum hydride, diethylaluminum ethoxide, di-iso-butyl aluminum dioxide, dipropylaluminum ethoxide, trimethylaluminum, triethylaluminum (TEA), tri-n-propylaluminum, tri-iso-butylaluminum (TIBA), tri-n-butylaluminum, tripentylaluminum, trihexaluminum, tricyclohexylaluminum, trioctylaluminum, triphenylaluminum, tri-p-tolylalluminium, tribenzylaluminum, ethyldiphenylaluminum, ethyldi-p-tolylaluminum, etildibenzylaluminum, diethylphenylaluminum, diethyl-p-tolylaluminum, diethylbenzylaluminum, and mixtures thereof.

5. The process according to claim 1, wherein:
the process is carried out in the presence of at least one inert organic solvent selected from the group consisting of: saturated aliphatic hydrocarbons; saturated cycloaliphatic hydrocarbons; mono-olefins; aromatic hydrocarbons; halogenated hydrocarbons; and/or
the concentration of the isoprene in the inert organic solvent is ranges from 5% by weight to 50% by weight, with respect to the total weight of the mixture of isoprene and inert organic solvent; and/or
the process is carried out at a temperature ranging from −30° C. to +60° C.

6. The process according to claim 1, wherein the linear or branched $C_1$-$C_{20}$ alkyl groups of $R_1$ is linear or branched $C_1$-$C_{15}$ alkyl groups.

7. The process according to claim 1, wherein the linear or branched $C_1$-$C_{20}$ alkyl groups of $R_3$ is linear or branched $C_1$-$C_{15}$ alkyl groups.

8. The process according to claim 1, wherein the linear or branched $C_1$-$C_{10}$ alkyl groups of $R_2$ is linear or branched $C_1$-$C_3$ alkyl groups.

9. The process according to claim 1, wherein the halogen atom is selected from the group consisting of chlorine, bromine, iodine, and fluorine.

10. The process according to claim 2, wherein
$R_1$ represents a methyl group;
$R_2$ represents a methyl group or an iso-propyl group; and
X, mutually identical, represents a chlorine atom.

11. The process according to claim 5, wherein the saturated aliphatic hydrocarbons are selected from the group consisting of: butane, pentane, hexane, heptane, and mixtures thereof.

12. The process according to claim 5, wherein the mono-olefins are selected from the group consisting of: 1-butene, 2-butene, and mixtures thereof.

13. The process according to claim 5, wherein the saturated cycloaliphatic hydrocarbons are selected from the group consisting of: cyclopentane, cyclohexane, and mixtures thereof.

14. The process according to claim 5, wherein the aromatic hydrocarbons are selected from the group consisting of: benzene, toluene, xylene, and mixtures thereof.

15. The process according to claim 5, wherein the halogenated hydrocarbons are selected from the group consisting of: dichloromethane, chloroform, carbon tetrachloride, trichlorethylene, perchloroethylene, 1,2-dichloroethane, chlorobenzene, bromobenzene, chlorotoluene, and mixtures thereof.

16. The process according to claim 5, wherein the process is carried out at a temperature ranging from −20° C. to +30° C.

17. The process according to claim 5, wherein the concentration of the isoprene in the inert organic solvent ranges from 10% by weight to 20% by weight, with respect to the total weight of the mixture of isoprene and inert organic solvent.

* * * * *